United States Patent
Epstein

(10) Patent No.: US 9,229,881 B2
(45) Date of Patent: Jan. 5, 2016

(54) SECURITY IN VIRTUALIZED COMPUTER PROGRAMS

(71) Applicant: Cisco Technology, Inc., San Jose, CA (US)

(72) Inventor: Joe Epstein, Palo Alto, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 14/723,216

(22) Filed: May 27, 2015

(65) Prior Publication Data
US 2015/0261690 A1 Sep. 17, 2015

Related U.S. Application Data

(63) Continuation of application No. 13/573,765, filed on Oct. 3, 2012, now Pat. No. 9,063,899.

(60) Provisional application No. 61/542,786, filed on Oct. 3, 2011.

(51) Int. Cl.
G06F 12/00 (2006.01)
G06F 12/14 (2006.01)
G06F 9/455 (2006.01)

(52) U.S. Cl.
CPC .......... *G06F 12/145* (2013.01); *G06F 9/45558* (2013.01); *G06F 2009/45583* (2013.01); *G06F 2009/45587* (2013.01); *G06F 2212/1052* (2013.01)

(58) Field of Classification Search
None
See application file for complete search history.

(56) References Cited

U.S. PATENT DOCUMENTS 5,699,507 A 12/1997 Goodnow et al.
5,787,285 A 7/1998 Lanning
(Continued)

FOREIGN PATENT DOCUMENTS

CN 103959247 A 7/2014
EP 723224 A1 7/1996
WO WO 2013/052121 A1 4/2013

OTHER PUBLICATIONS

U.S. Appl. No. 13/573,765, filed Oct. 3, 2012, Notice of Allowance, Feb. 25, 2015.
(Continued)

*Primary Examiner* — Matthew Bradley
*Assistant Examiner* — Craig Goldschmidt
(74) *Attorney, Agent, or Firm* — Hickman Palermo Becker Bingham LLP

(57) ABSTRACT

In an embodiment, a data processing method comprises implementing a memory event interface to a hypercall interface of a hypervisor or virtual machine operating system to intercept page faults associated with writing pages of memory that contain a computer program; receiving a page fault resulting from a guest domain attempting to write a memory page that is marked as not executable in a memory page permissions system; determining a first set of memory page permissions for the memory page that are maintained by the hypervisor or virtual machine operating system; determining a second set of memory page permissions for the memory page that are maintained independent of the hypervisor or virtual machine operating system; determining a particular memory page permission for the memory page based on the first set and the second set; processing the page fault based on the particular memory page permission, including performing at least one security function associated with regulating access of the guest domain to the memory page.

20 Claims, 11 Drawing Sheets

(56) References Cited

U.S. PATENT DOCUMENTS

| | | | |
|---|---|---|---|
| 6,430,670 | B1 | 8/2002 | Bryg et al. |
| 8,239,836 | B1 | 8/2012 | Franz et al. |
| 8,856,782 | B2 * | 10/2014 | Ghosh et al. ............ 718/1 |
| 8,984,478 | B2 | 3/2015 | Epstein |
| 2007/0006178 | A1 | 1/2007 | Tan |
| 2007/0039048 | A1 | 2/2007 | Shelest et al. |
| 2008/0086550 | A1 | 4/2008 | Evora et al. |
| 2008/0235793 | A1 | 9/2008 | Schunter et al. |
| 2009/0055693 | A1 | 2/2009 | Budko et al. |
| 2009/0228718 | A1 | 9/2009 | Manferdelli et al. |
| 2010/0031360 | A1 | 2/2010 | Seshadri et al. |
| 2010/0146620 | A1 * | 6/2010 | Simeral et al. ............ 726/21 |
| 2011/0047543 | A1 | 2/2011 | Mohinder |
| 2012/0204235 | A1 * | 8/2012 | Jaudon et al. ............ 726/4 |
| 2013/0086299 | A1 | 4/2013 | Epstein |
| 2013/0086550 | A1 | 4/2013 | Epstein |
| 2015/0199283 | A1 | 7/2015 | Epstein |

OTHER PUBLICATIONS

U.S. Appl. No. 13/573,765, filed Oct. 3, 2012, Final Office Action, Dec. 19, 2014.
International Searching Authority, "Search Report and Written Opinion", in application No. PCT/US2012000486 dated Dec. 10, 2012, 12 pages.
Current Claims in application No. PCT/US2012000486, dated Dec. 2012, 8 pages.
PCT, "International Preliminary Report on Patentability", in application No. PCT/US2012/000486 dated Apr. 8, 2014, 6 pages.
Satyajit Grover et al., "RKRD: Runtime Kernel Rootkit Detection", dated 2009, 13 pages.
Yee et al., "Native Client: A Sandbox for Portable, Untrusted x86 Native Code", dated 2009, IEEE Symposium on Security and Privacy, 15 pages.
Wang et al., "HyperSafe: A light Approach to Provide Lifetime Hypervisor ControlFlow Integrity", dated 2010, 16 pages.
Rutkowska, Joanna, "System Virginity Verifier", Defining the Roadmap for Malware Detection on Windows System, dated Sep. 28-29 2005, 38 pages.
Garfinkel et al., "A Virtual Machine Introspection Based Architecture for Intrusion Detection", dated 2009, 16 pages.
Vasudevan et al., "Lockdown: A Safe and Practical Environment for Security Applications", CMU-CyLab-09-011, dated Jul. 14, 2009, 18 pages.
Riley et al., "Guest-Transparent Prevention of Kernel Rootkits with VMM-based Memory Shadowing", dated 2008, 20 pages.
Kiriansky et al., "Secure Execution Via Program Shepherding", dated 2002, 16 pages.
Rutkowaska et al., "Qubes OS Architecture", Verision 0.3, dated Jan. 2010, 44 pages.
Garfinkel et al., "A Virtual Machine-Based Platform for Trusted Computing", SOSP, dated Oct. 2003, 14 pages.
Seshadri et al., "SeVisor: A Tiny Hypervisor to Provide Lifetime Kernel Code Integrity for Commodity OSes", SOSP, dated Oct. 2007, 16 pages.
Nance et al., "Virtual Machine Introspection", Observation or Interference?, IEEE Computer Society, Sep./Oct. 2008, 6 pages.
European Claims in Application No. 12838053.2—1953, dated Apr. 2015, 6 pages.
European Patent Office, "Search Report" in application No. 12838053.2—1953, dated Apr. 10, 2015, 7 pages.

* cited by examiner

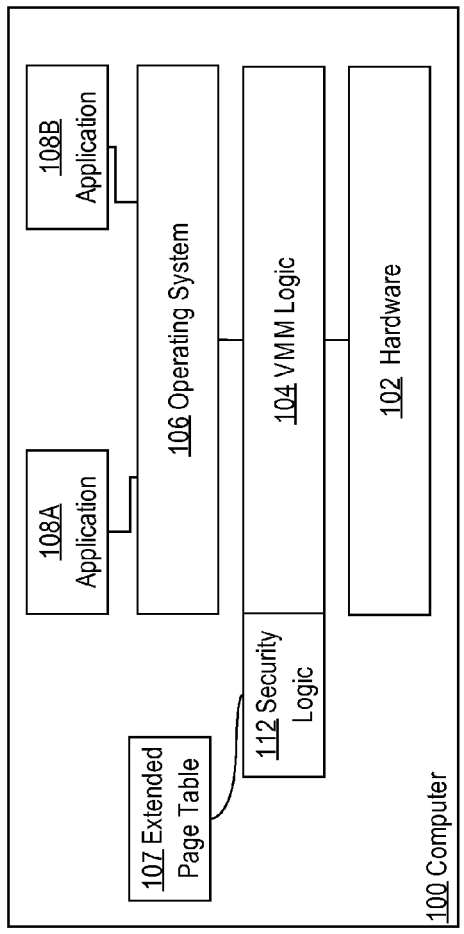
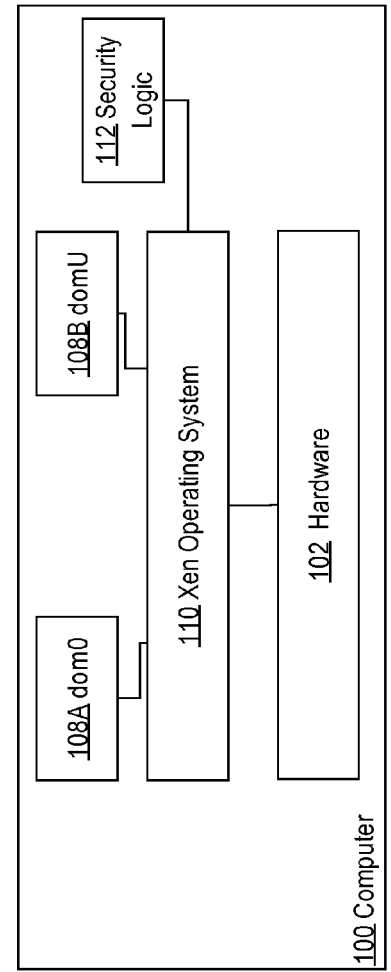

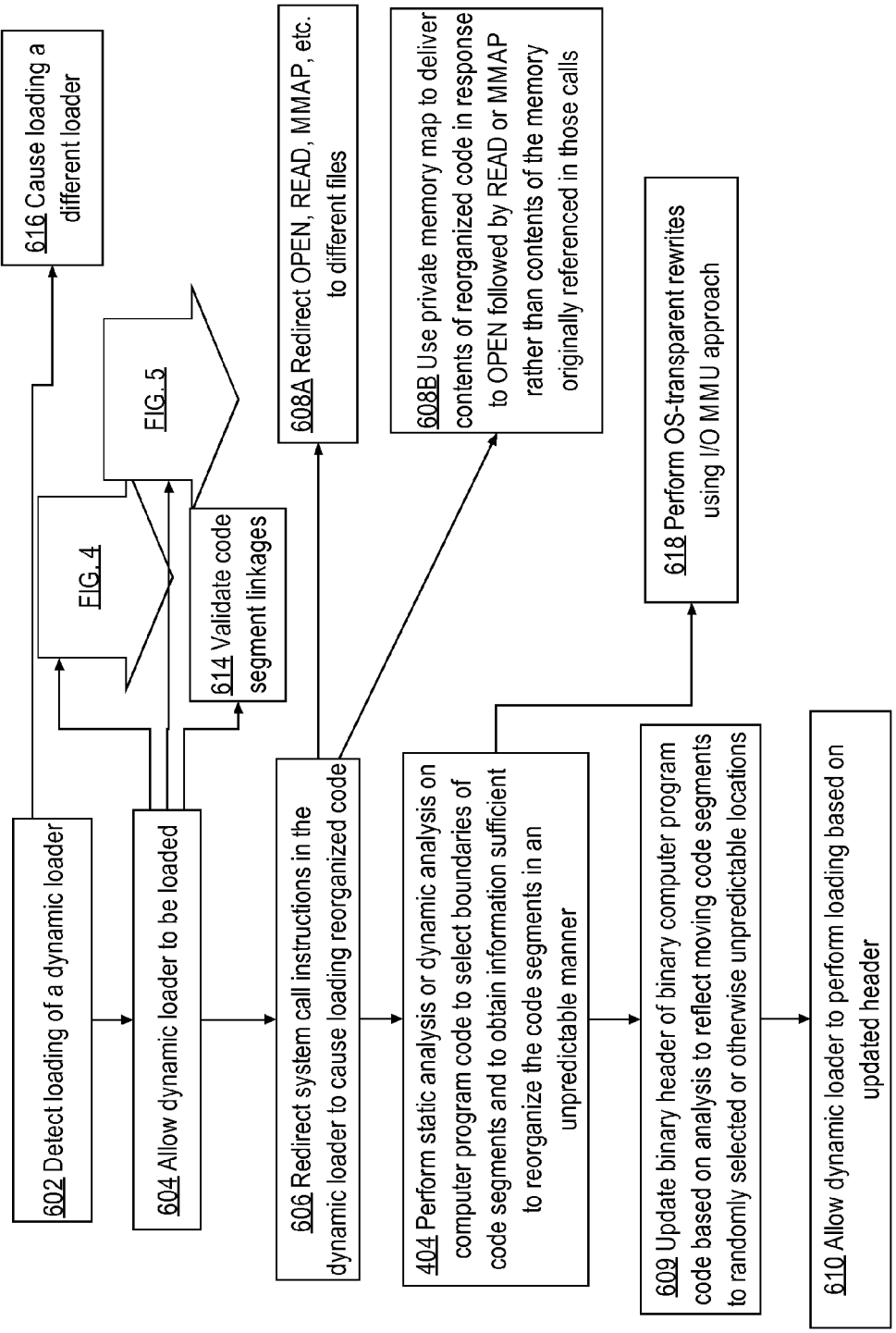

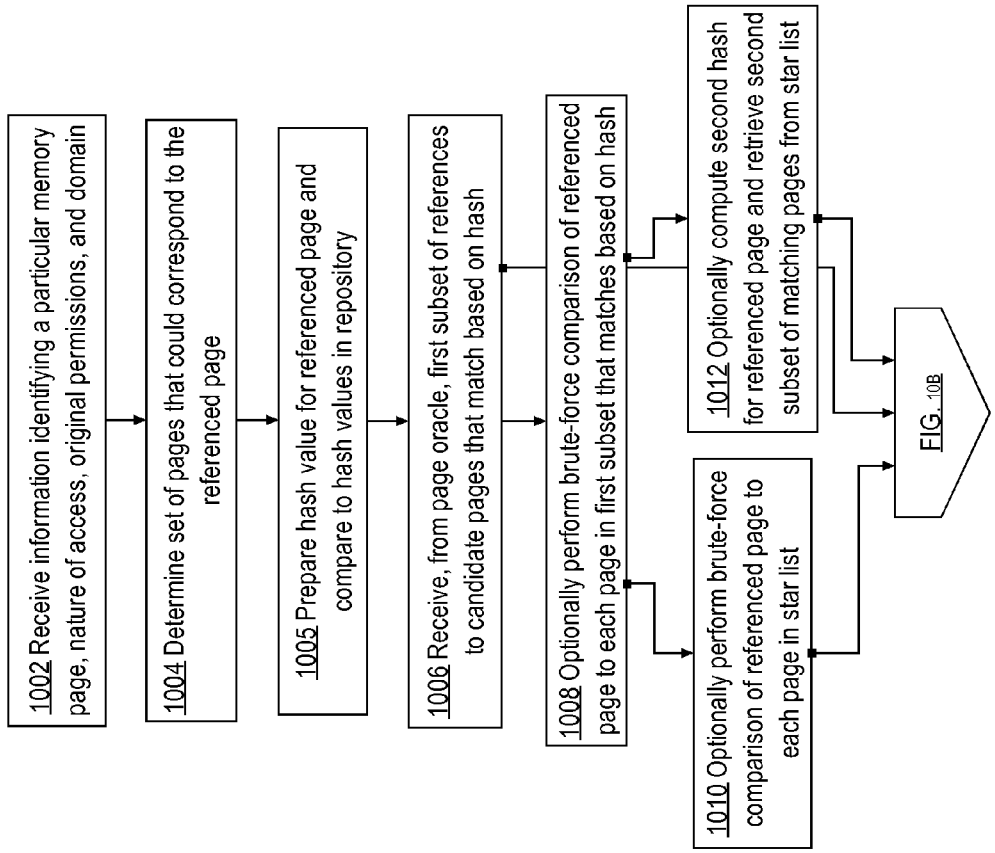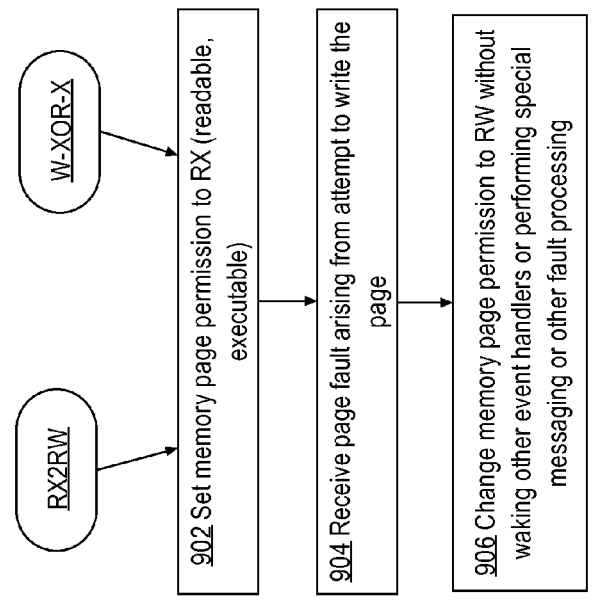

Fig. 11

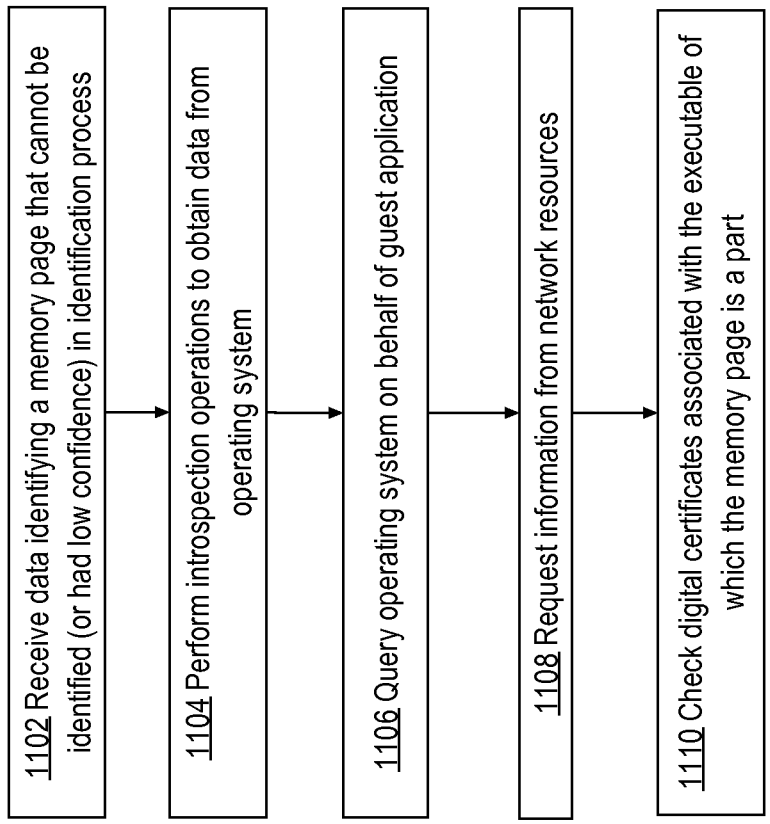

1102 Receive data identifying a memory page that cannot be identified (or had low confidence) in identification process 1104 Perform introspection operations to obtain data from operating system 1106 Query operating system on behalf of guest application 1108 Request information from network resources 1110 Check digital certificates associated with the executable of which the memory page is a part

Fig. 10B

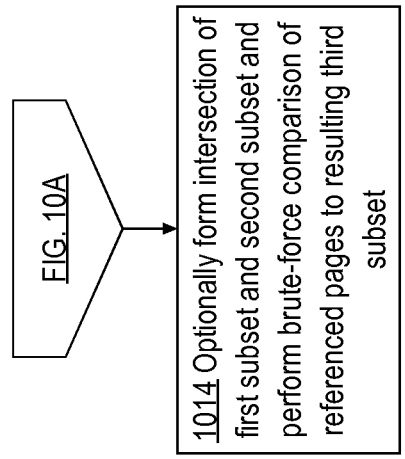

FIG. 10A

1014 Optionally form intersection of first subset and second subset and perform brute-force comparison of referenced pages to resulting third subset

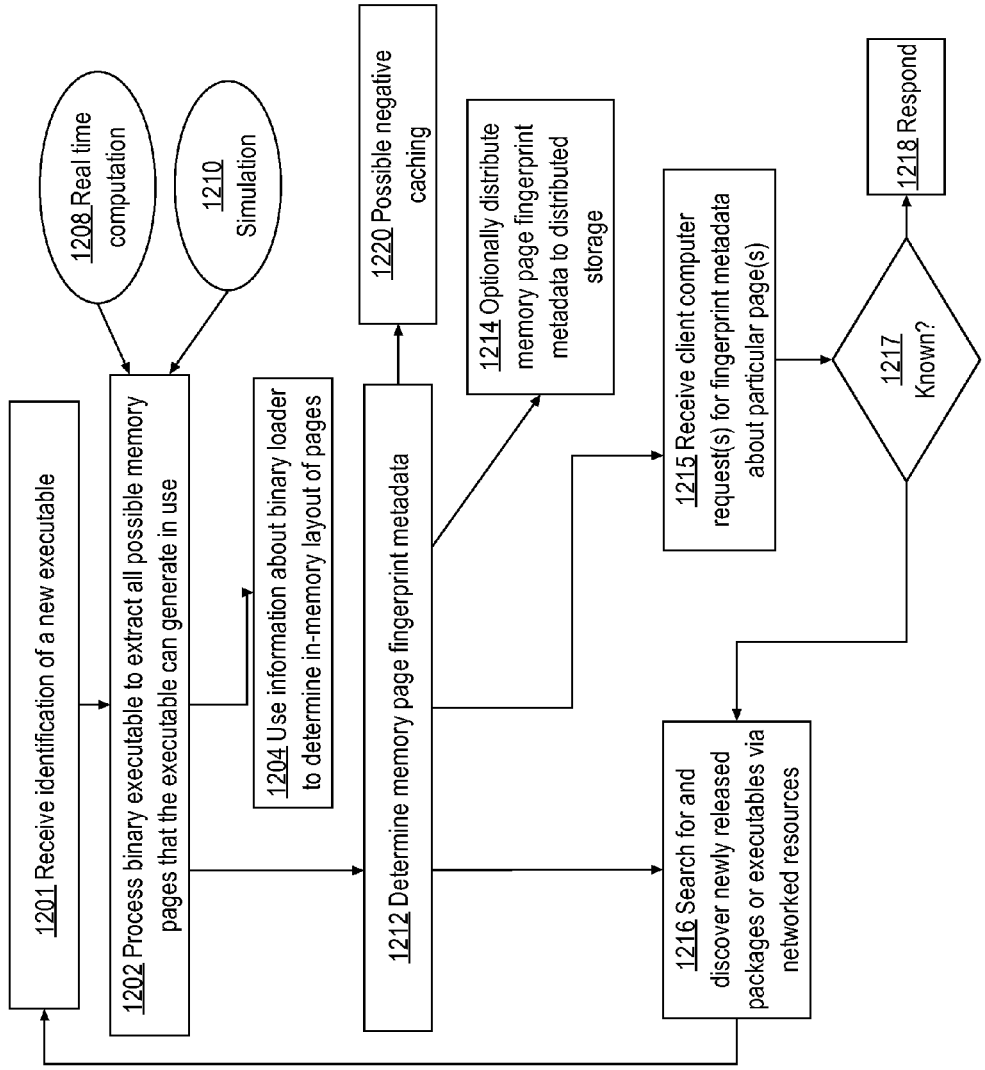

US 9,229,881 B2

SECURITY IN VIRTUALIZED COMPUTER PROGRAMS

BENEFIT CLAIM

This application claims the benefit under 35 U.S.C. 120 as a continuation of application Ser. No. 13/573,765, filed Oct. 3, 2012, which claims the benefit under 35 U.S.C. 119(e) of provisional application 61/542,786, filed Oct. 3, 2011, all of which are hereby incorporated by reference in their entirety for all purposes as if fully set forth herein.

TECHNICAL FIELD

The present disclosure generally relates to computer program security. The disclosure relates more specifically to techniques for improving the resistance of virtualized computer programs against various kinds of unauthorized use or attacks.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer programs that operate on servers that are accessible over the public Internet, and in other contexts, are known to have vulnerabilities to various kinds of attacks. Certain attacks are implemented by installing unauthorized or malicious code into the programs and causing execution of the foreign code.

Virtualization is a technique with which multiple different host operating systems, with associated computer programs, can run on a single computer or processor under control of a supervisory program, which may be a hypervisor. The use of virtualization creates new opportunities for attacks and new kinds of security vulnerabilities.

The SecVisor academic research project uses permissions bits maintained in an operating system page table to determine whether a page is writable or executable and to set page permissions so that pages of program code are not executable if they are also writable. However, SecVisor provides no mechanism for interworking with the memory page permissions that are maintained in a hypervisor or in a virtual machine monitor (VMM) that is closely coupled to a virtualization-optimized CPU, such as Xen on Intel processors.

Xen has provided the ability for a privileged domain to register on a hypercall interface for a memory event that is served by the memory handler of the hypervisor. Memory events have been used for demand paging of the domain, for example, for disk swapping of memory pages. Programs listening on memory events could use a different hypercall to read or write pages from or to disk and update page type values to indicate that the pages have been paged in or out. Xen implements a memory page framework denoted p2m that manages memory page type values for the purpose of supporting different uses of memory. For example, when a memory page has been paged out to disk, the memory page type value for that page may be set to "swapped out" (p2m_ram_paged) because the page is unavailable. This type is then converted to a memory access permission of not-readable. If a program attempts to read the page, Xen p2m throws a page fault and its page fault handler will page the memory in from disk, update the memory page type value to a paged-in type (which is converted to an access permission of readable), and return control to the program that caused the fault. Additional memory types exist for pages that are emulating hardware—and thus should cause the I/O emulator to react as if the memory access were a bus access to a peripheral. Additional page types are for shared memory between domains. However, none of the page types represent access permissions different from their type or usage, and thus make altering or restricting memory access permissions further for security—for example, of the content, rather than the emulation purpose—of the page impossible.

SUMMARY OF THE INVENTION

The appended claims may serve as a summary of the invention.

BRIEF DESCRIPTION OF THE DRAWINGS

In the drawings:

FIG. 1A illustrates a computer configured with certain elements of a security system for virtualized computer programs.

FIG. 1B illustrates a computer configured with certain elements of a security system for virtualized computer programs using Xen.

FIG. 6 illustrates a process of intercepting dynamic loading and responding to dynamic loading for security purposes.

FIG. 9 illustrates an example RX2RW process.

FIG. 10A, FIG. 10B illustrate an example process of identifying memory pages.

FIG. 11 illustrates parts of a harvesting process that may be used in an embodiment.

FIG. 12 illustrates an example process of generating and processing memory page fingerprint data.

DESCRIPTION OF EXAMPLE EMBODIMENTS

Figure 1C:
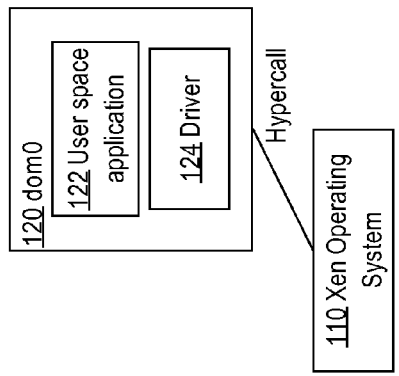
FIG. 1C illustrates further details of an embodiment that uses the Xen operating system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0 General Overview and Benefits of Embodiments

Xen has provided the ability for a privileged domain to register on a hypercall interface for a memory event that is served by the memory handler of the hypervisor. Memory events have been used for demand paging of the domain, for example, for disk swapping of memory pages. Programs listening on memory events could use a different hypercall to read or write pages from or to disk, allocate or de-allocate memory and update page type values to indicate that the pages have been paged in or out. However, in this context, there has been no practical method prior to this disclosure to implement page-level memory security without interfering with the existing Xen memory model so that legacy applications can execute without alteration.

In an embodiment, a data processing method provides. in a computer that is executing an INTEL XEN architecture comprising at least an INTEL XEN hypervisor, at least one privileged domain in computer memory, and a p2m page fault handler associated with a first table of a plurality of values of memory page types stored in memory for a plurality of pages of the memory, wherein the memory page types dictate the setting of memory page permissions (for use in a hardware memory page table) that comprise readable, writeable, executable, non-readable, non-writeable, and non-executable: creating and storing a second table of a plurality of values of memory page access permissions, wherein the second table is independent of the first table, wherein the memory page access permissions comprise at least readable, writeable, executable, not readable, not writeable, not executable; registering security logic as a memory event interface registered to a hypercall interface of the INTEL XEN hypervisor; the security logic receiving, through the hypercall interface, a page fault that identifies a particular memory page, wherein the page fault may be provided also to the p2m page fault handler; the security logic determining, based on the first table and the second table, a different permission for a particular memory page that is identified in the page fault; the security logic comparing the different permission to a memory action that is specified in the page fault; the security logic allowing the memory action only when the different permission indicates that the memory action is allowable. A further embodiment has the different permission be more restrictive than the permissions specified or determined by the multiple tables. Yet another has the different permissions be the most restrictive.

In an embodiment, the media further comprise sequences of instructions which when executed cause processing the page fault at the p2m page fault handler to perform demand memory paging to disk or shared memory handling in parallel with the identifying and determining steps.

In an embodiment, the media further comprise sequences of instructions which when executed cause requesting updating a particular memory page type permissions value for the particular memory page to a different value based on the different permission.

In an embodiment, the media further comprise sequences of instructions which when executed cause requesting updating a particular memory page type permissions value for the particular memory page to a different value based on different permission, except when the different value is unsupported by CPU hardware.

In an embodiment, the memory page access permissions comprise at least readable, writeable, executable, not readable, not writeable, not executable, readable writeable and executable; and readable-executable-to-readable-writeable.

In an embodiment, the memory page access permissions further comprise at least a "readable-executable-to-readable-writeable" memory page access permission.

In an embodiment, the media further comprise sequences of instructions which when executed cause, in response to determining that the memory action is execute, automatically modifying the memory page access permission of the particular memory page to readable-writeable.

In an embodiment, the media further comprise sequences of instructions which when executed cause ensuring that the second table indicates that the particular memory page is not both writeable and executable.

Another embodiment provides one or more non-transitory computer-readable media storing one or more sequences of instructions which when executed cause performing: in a computer that is executing an INTEL XEN architecture comprising an INTEL XEN hypervisor, at least one privileged domain in computer memory, and a p2m page fault handler associated with a first table of a plurality of values of memory page type permissions stored in memory for a plurality of pages of the memory, wherein the memory page type permissions comprise readable, writeable, not readable and not writeable: creating and storing a second table of a plurality of values of memory page access permissions, wherein the second table is independent of the first table, wherein the memory page access permissions comprise at least readable, writeable, executable, not readable, not writeable, not executable; registering a memory event interface registered to a hypercall interface of the INTEL XEN hypervisor; receiving, through the hypercall interface, a page fault that identifies a particular memory page, wherein the page fault may be provided also to the p2m page fault handler; identifying an application program or other metadata associated with the particular memory page based on a database that maps identifiers of known memory pages to metadata for the known memory pages; determining whether the particular memory page is authentic; determining whether to authorize use of the particular memory page based on a security policy applicable to the particular memory page.

In an embodiment, the media further comprise sequences of instructions which when executed cause processing the page fault at the p2m page fault handler to perform demand memory paging to disk or shared memory handling in parallel with the identifying and determining steps.

In an embodiment, the instructions which when executed cause identifying comprise instructions which when executed cause forming a hash value based upon a specified set of bytes of the particular memory page, forming an erasure mask based upon one or more sets of variable bytes of the particular memory page, determining whether the hash value matches any of a plurality of known hash values in the database, and determining whether all bytes of the particular memory page after applying the erasure mask match any other pages in a star list. In this context, a star list is a list of pages that have erasures in any of specified set of bytes.

In an embodiment, the instructions which when executed cause identifying comprise instructions which when executed cause harvesting a plurality of other pages and obtaining information about the particular memory page from the other pages.

In an embodiment, the instructions which when executed cause harvesting comprise instructions which when executed cause sending, over a network, to one or more instances of security logic on other computers, one or more requests for metadata about the particular memory page.

In an embodiment, the instructions which when executed cause harvesting comprise instructions which when executed cause obtaining one or more digital certificates associated with an application program of which the particular memory page is a part, validating the one or more certificates, and determining to authorize use of the particular memory page only when the one or more certificates are validated.

In an embodiment, the instructions which when executed cause harvesting comprise instructions which when executed cause obtaining one or more information elements relating to the particular memory page from an operating system of the computer.

In an embodiment, the media further comprise instructions which when executed cause injecting one or more system-level calls into the operating system.

In an embodiment, the media further comprise instructions which when executed cause modifying the particular memory page after the identifying.

In an embodiment, a database stores copies of pages of memory representing known sections of executable computer program code against. Before or during running a subject program, pages of code of the subject program are compared to determine which of the known code pages, if any, matches the subject program's code. The results of the comparison are used to determine whether to allow or deny execution of the subject program's code. Additionally or alternatively, various remediation actions may be performed. In an embodiment, a page oracle implements a process to determine which of a large number of known memory pages correspond to a page of the subject program. In particular, because the database may comprise millions of pages, techniques are provided to rapidly converge upon a candidate set of pages that may correspond to a particular page of the subject program.

Techniques for initially populating and updating the database; loading certain programs into the database on execution; using a multi-tier hierarchy of databases or set of peer-to-peer databases to update local databases and provide superior program information and code; presumptive fetching and local cache management; and pausing or killing execution of the subject program during updates. In an embodiment, techniques are provided for populating the database during absence of network connectivity and reconciliation of updates after re-establishment of network connectivity. In an embodiment, populating the database is based on machine images uploaded via data center orchestration tools; scavenging programs from images; and matching scavenged programs to updates from external databases.

The embodiments that have been described may offer various benefits over prior practice. For example, embodiments allow stopping almost all forms of code injection and code modification attacks on computer programs, by preventing malicious users from modifying binaries and allowing them to run, preventing adding new binaries and letting them run. Embodiments also prevent hardware from undertaking similar attacks. Examples of attacks that may be thwarted include advanced persistent attacks such as RSA attacks, the Stuxnet worm, and others. Privilege escalation attacks that involve injecting code may be stopped.

Certain embodiments enable using existing Xen APIs and allowing existing Xen facilities, such as the Xen p2m memory type permissions functions, to operate without alteration while implementing an independent memory access permissions framework essentially on top of Xen. Embodiments provide the ability to modify Xen to capture memory events and then perform independent security-focused processing, while allowing Xen's page fault handler to operate in parallel on the same or different pages. Therefore, for example, legacy applications that implement demand paging, shared memory management, or other functions that require trapping page faults may continue to execute without modification. However, in some instances the Xen page fault handler ultimately may cause two instances of separate page fault handling to occur—one in p2m, and the other in the embodiments that are described herein. Embodiments thus provide an entirely independent read-write-execute memory access permission framework on top of the existing Xen memory type framework for implementing private security handling based on most restrictive permissions logic so that the most restrictive permissions currently in force for a particular page govern the treatment of that page.

While certain embodiments may be implemented in an independent page fault handler, the location of code (whether in Xen facilities or elsewhere) is not critical and various embodiments may implement the functions described herein in any convenient module, API, or other code location.

2.0 Runtime Security Techniques for Virtualized Computer Programs

Example Embodiment Using Xen

FIG. 1A illustrates a computer configured with certain elements of a security system for virtualized computer programs. In an embodiment, computer 100 comprises hardware 102, VMM logic 104, security logic 112, operating system 106, and one or more applications 108A, 108B. In an embodiment, computer 100 may comprise any of a server computer, personal computer, laptop computer, workstation, or other computing device. In an embodiment, hardware 102 represents one or more hardware resources of the computer 100 including display elements, main memory, mass storage devices such as disk drives, input/output devices, central processing units or cores, and other hardware.

Operating system 106 may comprise any of a plurality of operating systems including LINUX, UNIX or variants thereof, Apple OS-X, Microsoft Windows, or others. Applications 108A, 108B represent any number of one or more application programs such as databases, customer relationship management systems, e-mail servers, document or word processing servers, spreadsheets, software development environments, or others.

The VMM logic 104 may comprise a hypervisor or other virtual machine monitor. The security logic 112 comprises one or more computer programs, application programming interfaces, or other software elements that are configured to implement one or more of the techniques herein, generally involving applying security checks to pages of memory. Typically, a page of memory comprises 4096 bytes of memory corresponding to an executable program or data. In some embodiments, security logic 112 may be integrated within the VMM logic 104. In an embodiment, VMM logic 104 may comprise a conventional hypervisor and separate security logic 112 may be supplied to extend the configuration or capabilities of the hypervisor to implement the techniques herein. In still another embodiment, VMM logic 104 need not comprise a hypervisor but may comprise other logic that is configured for controlling the read, write, execution permissions of the pages of memory that are used in the computer 100, in such a way that the VMM logic can intercept page faults. A page fault may occur, for example, when a user or computing element attempts to execute a memory page that has been previously flagged as non-executable.

In some embodiments, as further described in other sections herein, an extended page table (EPT) 107 may be coupled to or managed by the security logic 112, independently or integrated with VMM logic 104. The EPT 107 may store a set of memory page permissions bits or flags, for all executable pages of memory, that are separate from or independent of any memory page permissions bits that may be managed by the VMM logic 104, the hardware 102 or operating system 106.

In an embodiment, VMM logic 104 may be configured not to implement page fault mechanism but, rather, to use page fault mechanisms that are implemented within the central processing unit of the computer 100. In various embodiments, VMM logic 104 may have access to hardware including the central processing unit, but hardware access is not essential. In some embodiments, when CPU interfaces to a conventional hypervisor are utilized, then the VMM logic does not supplant the hypervisor with respect to page fault processing and an integrated approach as seen with VMM logic 104 is preferred. Unlike past approaches, embodiments operate in conjunction with the memory page permissions bits of a hypervisor, rather than with memory page table bits of an operating system.

For example, FIG. 1B illustrates an embodiment in which the Xen operating system 110, an open source virtual machine monitor developed by Citrix XenSource, runs on hardware 102 and manages domains such as privileged dom0 108A and unprivileged domU 108B. The term "domU" refers to a particular domain that is labeled or denoted using any unsigned integer. Domain dom0 has complete system control, whereas domU is a guest that is intended to be virtualized. Security logic 112 is coupled to the Xen OS 110 through an appropriate application programming interface (API). Different hypervisors may be used in place of the Xen operating system 110 and interfaced to security logic 112 using different interfacing approaches. For example, in the case of Xen, a Xen-internal API may be added or used, or security logic may be directly embedded within the hypervisor. In some embodiments, selected APIs are added to Xen, and an operating system is added and is configured to run as close to the "bare metal" hardware as possible, logically beneath the hypervisor or instead of it (though still retaining some element of a supervisory role), and hosts a single application or multiple applications protected by the security logic 112.

FIG. 1C illustrates further details of an embodiment that uses the Xen operating system. In an embodiment, Xen operating system 110 is coupled to dom0 120 (or a privileged domU), which comprises user space application 122 and a driver 124. The domain dom0 120 interfaces to the Xen operating system 110 using a hypercall framework. Alternatively, normal function calls may be used to integrate the security logic 112 within the Xen operating system 110.

Familiarity with the architecture of Xen is assumed in this disclosure, but for convenience and completeness, certain architectural principles of Xen are repeated herein. Further, while certain embodiments herein are described in connection with Xen and Intel CPU terminology for the purposes of describing a clear example, embodiments are not limited to the context of Xen and Intel processors and functionally equivalent embodiments may be implemented using different platforms, including AMD processors. In such implementations, slightly different terminology may be used by the CPU or VMM vendor to indicate equivalent logic and functions as compared to those that are described herein.

With Xen, at runtime, a boot loader executes followed by the code implementing Xen or representing Xen itself. Xen is generally considered a micro-kernel, although Citrix characterizes Xen as a hypervisor. Upon execution, by using CPU-level virtualization hooks, Xen assumes a most privileged position in the system, denoted root mode, which corresponds to operating as a hypervisor. Xen then creates a first domain, denoted dom0, which executes in non-root mode, and is therefore a guest; however, Xen then maps all memory of dom0, except for certain memory that Xen reserves to itself, in a manner that provides dom0 with effectively direct hardware access. Consequently, dom0 operates as if it is directly reading from and writing to the hardware. Further, when dom0 seeks to perform a particular hardware access, while Xen is capable of intercepting the access request, all such requests are permitted to complete, possibly using the virtualization hooks provided by the CPU, in order to enable the system to complete bootstrap loading. In effect, Xen creates dom0 and then boots dom0; from the point of view of the CPU, dom0 is virtualized, while from the point of view of the hardware, dom0 is not virtualized.

As a result, dom0 has control of hardware, but a hypervisor is layered underneath. The next domain to be created, domU, has no access to hardware; instead, domU is virtualized and Xen exposes, based on configuration, a set of default virtual hardware. For example, a default virtual VGA display card is exposed and appears to be real to domU; however, when domU access the virtual hardware, Xen throws a page fault indicating that the requested memory range is not writable or readable. The fault may comprise a hypervisor exit type of fault. In response, Xen, acting as kernel, may direct the request to a program in dom0 that virtualizes the hardware, via a callback or similar mechanism. In response, the program may wake up a corresponding driver and inform the driver that a fault occurred and the type of write or read that was requested. The driver may then complete execution of the request using, in the case of a display request, X windows or a similar unit of the operating system. Similar techniques may be used to virtualize mouse operations and other hardware operations.

The designation of a domain as privileged or unprivileged specifies whether the domain may execute selected functions of the hypercall interface that are designated as privileged. All hypervisors normally provide a hypercall interface. Hypercall interfaces that are privileged are generally associated with root level access, such as admin level or secure access. For example, only a privileged domain can read the memory of another domain; thus, dom0 can read all memory of every other domain.

Figure 7:
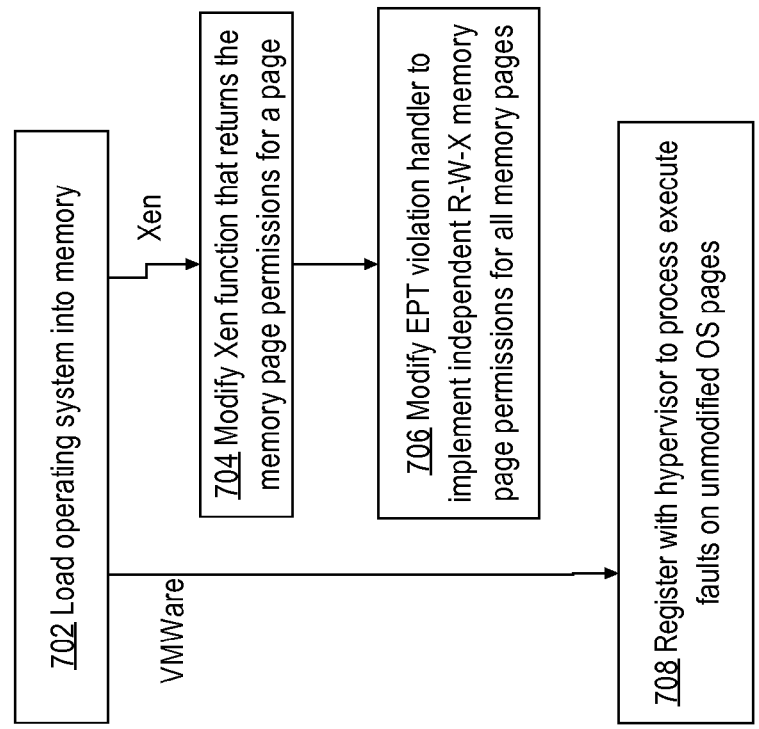
FIG. 7 illustrates an example process for security on memory pages.

In an embodiment, security logic that implements the techniques herein, whether implemented as VMM logic 104, 105 of FIG. 1A or as security logic 112 of FIG. 1B, comprises logic that implements a memory event interface to the hypercall interface of the hypervisor or VMM. FIG. 7 illustrates an example process for security on memory pages. At operation 702, the Xen system is loaded or bootstrapped as described in the preceding sections. An implementation may comprise (as seen at 704) modifying an existing Xen function that is called when a page fault occurs to determine what native memory page permissions govern a page, and (as seen at 706) modifying the page fault handler of Xen, known as the "EPT violation handler" to implement the approaches described herein. In particular, the security logic implements the ability to maintain flags and instruct the Xen operating system 110 that certain pages of memory—independent of the memory page permissions that Xen natively maintains—are readable, writable, executable (R-W-X or r-w-x). Thus, the security logic enables set, get, and event operations associated respectively with setting bits that indicate, for any page of memory, whether the page is readable, writable, executable; getting values of the independent permissions bits; and taking an event in the nature of a page fault on attempted unexpected use of pages that are marked with the independent memory page permissions bits. In an embodiment, events include: page marked not readable, and was read; page marked not writable, and was written; page marked not executable and was executed.

Figure 8:
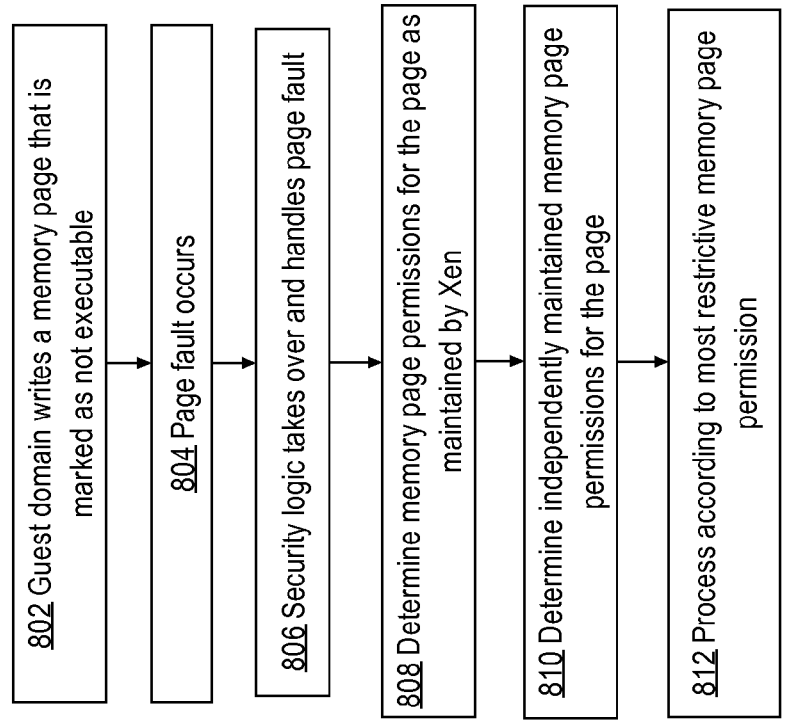
FIG. 8 illustrates a page fault processing method.

In an embodiment, processing of page faults proceeds generally as follows and as in FIG. 8, which illustrates a page fault processing method. Assume that a guest domain writes a page that was marked not executable, as seen at 802. In response, in a Xen implementation, at 804 a page fault to Xen occurs. Xen executes a domain notification specifying a memory event and indicating that a particular page was marked not executable and places the event in a processing queue. The queue is associated with a domain, and may also be associated with user space application comprising the security logic running in dom0 or a privileged domU. Thus the security logic can take over page fault processing on behalf of Xen, as seen at 806. To set or get page permissions, the user space application issues a hypercall back to Xen requesting Xen to make a change in the page and return. Using this basic communications framework and API functions that are coupled to Xen, the security logic can enforce an independent scheme of page permissions without modification to Xen's native memory page permissions and page fault processing logic.

In particular, by maintaining a set of independent memory page permissions bits that are entirely separate from Xen's native memory page permission mechanism, the security logic can enforce separate policy without disrupting native hardware operations and interfaces of Xen or another operating system. The memory page permissions for the page as maintained by Xen are determined, as seen at 808. The memory page permissions for the page based on independent management by the security logic are also determined, as seen at 810. A "most restrictive permissions" policy is used as follows, as seen at 812. If Xen native memory page permissions indicate that a particular page is not readable or not writable, but the security logic independent memory page permissions indicate that the same page is readable or is writable, then security logic will modify its independent memory page permissions to indicate that the same page is not readable or not writable, expecting that when the security logic receives a return after calling Xen to modify the page, the result will be that the page is readable or writable. On an attempt to read or write the page, Xen will determine that its native memory page permissions indicate that the page is not readable or writable. In response, the Xen page fault handler must determine whether to process the page fault internally or to send a page fault event to the security logic.

In an embodiment, the determination is made as follows. If fault type N (N comprising read, write, or execute) occurred, and the security logic had marked the page as not "N"-able, a page fault would be sent to the security logic. Furthermore, if the Xen native memory page type indicates that the page should not be executable, then the fault is internally processed by the Xen page fault handler as well. Consequently, the security logic is able to enforce its independent memory page permissions without essentially stealing all processing of page faults from Xen or having to create combined page types that represent both security and hypervisor needs In an embodiment, Intel CPU hardware configured to be compatible with Xen exposes the native memory page permissions of Xen and which indicate whether a particular page is readable or writable. In an embodiment, the independent memory page permissions of the security logic comprise access types and indicate whether a page is readable, writable, executable, or a combination. Thus, an embodiment may implement memory page permissions that are not natively available on the CPU or with Xen, such as marking a page as not executable. In an embodiment, the following memory page permissions are supported and enforced: none; readable; writable; executable; readable and writable; readable and executable; writable and executable; readable-writable-and-executable; and readable-executable-to-readable-writable. The preceding memory page permissions may be abbreviated as: None; R; W; X; RW; RX; WX; RWX; RX2RW.

In some embodiments, a particular CPU may not support setting one or more of the preceding independently maintained memory page permissions. For example, certain Intel CPUs are known not to support pages that are writable and executable but not readable, or pages that are only writable. In these embodiments, the security logic is configured not to attempt to set a CPU hardware memory page permission equivalent to an unsupported independent memory page permission type, which would cause the CPU to throw a misconfiguration trap. In these embodiments, the security logic may set a permission to None, which is always valid.

2.1 the RX2RW Memory Page Permission Type

In an embodiment, the security logic implements an RX2RW memory page permission type which results in setting hardware memory page permissions bits to RW. FIG. 9 illustrates an example RX2RW process. Initially the memory page permission for a particular page may be set to RX, as seen at 902. An attempt to write the page occurs, as seen at 904. In response, the page fault handler automatically converts the memory page permission for the page to RW without waking other event handlers or performing special messaging or other fault processing, as seen at 906. In effect, the executable (X) bit of an RX page is removed and converted to W. The security rationale is that a write operation on an RX page may result in malicious modification of a previously executable page; therefore, the page should be regarded as suspect or "dirty" and should not be allowed to execute again. Automatically converting RX permissions to RW enforces an immediate security restriction on such modified pages. Consequently, a subsequent attempt to execute the RW page will cause a page fault which the security logic can process.

Further, the RX2RW memory page permission type may be used to implement write-exclusive-or-execute (W⊕X) logic such that no pages are both writable and executable concurrently.

2.2 Example Embodiment Using VMWare

In an embodiment, the hypervisor is that from VMWare, and exposes APIs that may be used in a manner similar to the preceding description, with material modifications as now described.

While Xen hypervisors use CPU hardware extensions to set memory page permissions bits and enforce permissions logic via extended page tables, VMWare internally performs binary translation of the operating system logic that enforces memory page permissions. Binary translation is used because an operating system running as a guest of VMWare is not paravirtualized as are those that run with Xen; that is, the guest operating system cannot modify itself and other logic must modify the operating system instead.

For example, the operating system may be configured to directly control hardware resources and to directly modify memory through the use of privileged calls, but such direct modification conflicts with the fundamental operating principles of a hypervisor, which must control the same resources and modifications. Therefore, the hypervisor must modify the operating system to prevent the direct use of hardware and memory via privileged calls. The approach with Xen is either to rewrite the guest operating system so that function calls are directed to different logic that allows intercepting and specially processing privileged calls, or to use hardware extensions so that Xen maintains a hardware-based page table that is different from and has superior authority in comparison to the page table of the guest operating system.

In contrast, under VMWare, as an example, when the guest operating system executes a MOV TO CR3 instruction to modify a page table, VMWare performs a binary translation of the instruction into a call to a function of the VMWare hypervisor that ensures that the guest operating system cannot perform a privileged call or that enforces memory page permissions. The guest operating system remains unmodified and on-the-fly binary translation takes the place of modification. The binary translation may be performed at the time that the hypervisor loads the executable of the guest operating system into memory but before the guest operating system is executed. The binary translation may be performed on a page-by-page basis in which a modified page is created in which privileged instructions have been removed and replaced with function calls; jump instructions may direct the runtime flow to the modified operating system pages. The modified pages may be stored in a code cache. For the security logic described herein, with VMWare the operational end result is the same as for Xen, with a native binary translation step interposed internally by VMWare.

In an embodiment, execute type page faults may be enforced by the security logic registering with the VMWare hypervisor for execute faults on the unmodified operating system pages, as seen at 708 (FIG. 7). Thereafter, when a particular operating system page is executed, instead of jumping to the modified page in the code cache, the VMWare hypervisor may present the original, unmodified page to the security logic for processing in response to the page fault. Consequently, R-W-X permissions logic may be enforced even when the VMWare hypervisor has performed binary translation of operating system executable pages. The page fault processing of the security logic may use the same codebase or APIs as described above for the Xen implementation, and shown in FIG. 8.

Figure 1D:
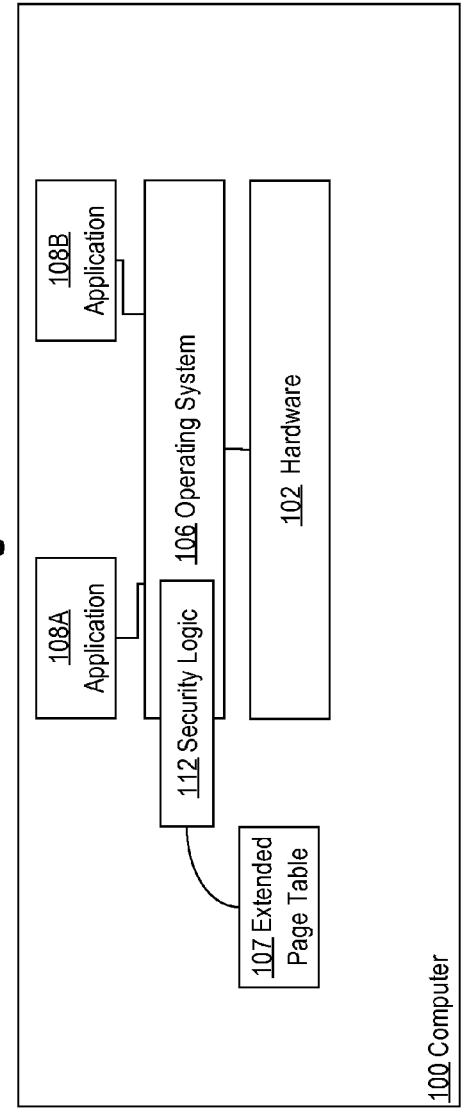
FIG. 1D illustrates an embodiment in which a special-purpose hypervisor is installed into a guest operating system to integrate with security logic.

2.3 Example Embodiment Using Special-Purpose Hypervisor with Integrated Security Logic FIG. 1D illustrates an embodiment in which a special-purpose hypervisor is installed into a guest operating system to integrate with security logic. In an embodiment, the guest operating system 106 has full access to hardware, and security logic 112 implements a limited-purpose hypervisor that is installed into or integrated with the guest operating system to implement logic to process memory page accesses. The EPT 107 is coupled to security logic 112 and maintains a set of memory page permissions values that are independent of any memory page permissions bits that the operating system 106 may maintain.

In this embodiment, security logic 112 may be viewed as a micro-kernel that is configured to run a single guest operating system 106 and that does not virtualize the hardware 102. User space programs are unaware that security logic 112 is present. A benefit of this approach is that user space programs have complete access to the original hardware and drivers, which may be a better arrangement for certain kinds of applications, such as games.

In an embodiment, techniques are used to address potential vulnerabilities that may arise when the guest operating system 106 have direct access to hardware and memory without virtualization. For example, the guest OS 106 or a user space program could effectively implement a direct access to memory containing executing pages of the security logic 112 or its hypervisor. As one example, the guest OS 106 could establish a buffer for a network interface card with a pointer to a page of memory that would otherwise cause a page fault if the OS 106 attempted a direct access; the result is defeating valuable security protections.

In an embodiment, the hypervisor within security logic 112 is configured to trap memory accesses, but comprises logic to identify the kind of indirect attempts to access memory that have just been described. In an embodiment, security logic 112 is configured with logic that is aware of all proper uses of hardware interfaces and establishes traps or callbacks for all operations that can be requested on the hardware. For example, security logic 112 may be configured to establish permissions values (such as "not writable") for each register of a particular type of hardware element, to recognize a poke to a register on a particular type of network interface card through a page fault based on the permissions value and, in response, to obtain a value of a pointer that was used in the poke operation, evaluate the value, and determine if the value is allowed. If the pointer value is out of bounds, then the operation may be disallowed.

In some embodiments, security logic 112 may be configured to query each hardware element with a request to return a hardware identifier for the purpose of determining a device type of the hardware element so that the correct logic may be used for establishing and enforcing permissions values. Alternatively, heuristic approaches may be used to recognize disallowed pointers, without specialized knowledge of the hardware elements.

In another embodiment, functions of an input/output memory management unit (IOMMU) may be used. An IOMMU forms part of certain CPU architectures and comprises a set of page tables that can translate and set permissions. In an embodiment, security logic 112 may set permissions values of the IOMMU page tables associated with specified hardware elements to indicate that the hardware elements are not executable. Consequently, when guest operating system 106 attempts a disallowed hardware access, the requested access will fail. In some embodiments, security logic 112 may not set page table values associated with hardware as not writable, because a subsequent write attempt by the guest operating system 106 will cause a hardware crash, which is undesirable.

As an alternative, security logic 112 is configured to know whether memory associated with a hardware element is potentially writable by the operating system and to allow known acceptable write operations. For example, if a particular hardware buffer is known to contain data and not code, then allowing the operating system 106 to write the buffer is acceptable because malicious modification of executable code in the buffer cannot occur. Typically a legitimate operating system will never request hardware to modify executable pages of code; this limitation is essential, for example, for a file system to trust that executable pages that have been loaded into a file system cache will not be modified; if modification occurred, the pages would have to be re-loaded. Thus, file system elements such as disks do not modify code pages in memory and only a maliciously modified operating system, file system or other element will attempt to write pages of memory that are marked as executable and contain code. Therefore, security logic 112 is configured to block all hardware direct memory access (DMA) requests to write for pages of memory that are marked executable.

In one approach, security logic 112 implements the following procedure. Assume that a MMU of the CPU (or the EPT, in Intel parlance) initially sets a page as RW. An execute occurs on the page, and in response, the MMU marks the page as RX. In further response, the IOMMU page table permissions values for the same page are updated to R only. Consequently, hardware elements—all requests from which must traverse the IOMMU prior to reaching protected pages—cannot modify the R marked page in the future. Thus, the page has been protected as executable at the MMU, but is not writable by the hardware as enforced by the IOMMU.

Security logic 112 further sets a breakpoint in the CPU's memory management system that provides feedback to the security logic when the same page has been freed, de-allocated or returned to the page pool. In response, page permissions for the page may be reset to RW/non-X at the MMU and RW at the IOMMU; this responsive operation ensures that the hardware will not crash when the same page is later used for a different purpose, by removing the non-W permission.

As a result, reliable hardware elements of a CPU system may be used to prevent even hardware DMA attacks on executing programs. At the same time, a guest operating system 106 may have direct use of hardware without exposing hardware vulnerabilities. Further, the preceding techniques may be implemented on personal computers including desktops, laptops, tablet computers, smartphones, and others; unlike prior or alternative approaches, the techniques herein are not limited to server computers or cloud computing contexts in which a conventional hypervisor is typically available. This combination of capabilities is extremely powerful and useful and represents a distinct improvement in the field.

2.4 Example Embodiment Illustrating Runtime Processing

Figure 2:
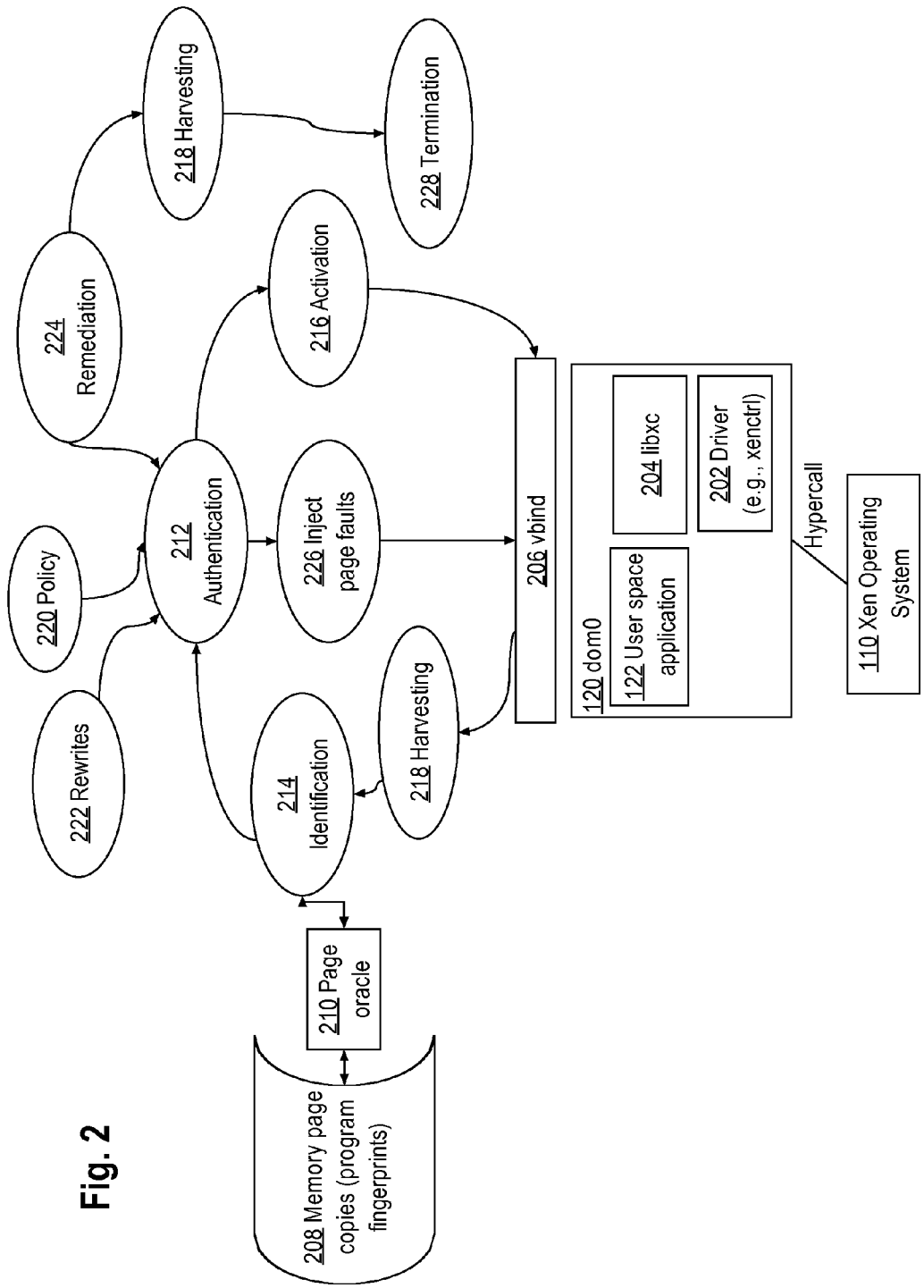
FIG. 2 illustrates an approach for identifying, authenticating, and authorizing pages of memory in a virtualized computer environment.

FIG. 2 illustrates an approach for identifying, authenticating, and authorizing pages of memory in a virtualized computer environment.

In an embodiment in which operating system Xen 110 is the hypervisor, security logic 112 registers through a hypercall interface to a "libxc" library 204 of Xen, which is coupled to a Xen control driver 202. The control driver is configured to map hypercalls to operating system calls to facilitate operation of user space programs. In an embodiment, security logic 112 comprises modifications to libxc and to the Xen control driver that add API calls, driver functions and library functions.

Binding logic 206 denoted "vbind" is layered above the Xen control driver and functionally binds aspects of the security logic 112 to the hypervisor. The binding logic 206 serves as a hypervisor-specific adapter, so that a different form of binding logic is used depending on whether the hypervisor is Xen, VMWare, or a proprietary hypervisor. The binding logic 206 exports APIs to elements of security logic 112 that are configured to perform identifying memory pages at 214, authenticating memory pages at 212, and activating memory pages at 216, among other operations. The identifying, authenticating, and activating operations 214, 212, 216 may comprise a logical loop as seen graphically in FIG. 2 and implements a memory invariant that enforces both W⊕X policy and the authenticity of every page of memory.

FIG. 10A, FIG. 10B illustrate an example process of identifying memory pages. Referring first to FIG. 10A, in an embodiment, at 1002, on a page fault that Xen or another hypervisor has passed to the security logic 112, information identifying a particular memory page (for example, a pointer to the page number), the nature of the access (read, write, execute, etc.), the original permissions associated with the page (which do not match the nature of the requested access), and the domain in which the page fault occurred, are received. The subject of such a page fault is denoted the "referenced page" herein. When the page fault results from attempted execution, the security logic 112 has not yet granted permission for execution of that page. Therefore, in response, the security logic 112 seeks to identify the page at 214, authenticate the page as known at 212, and authorize the page to execute at 216. In the identifying at 214, security logic 112 seeks to determine a match of the referenced page to a page that is known in a page database 208, which essentially comprises a repository of known program code fingerprints. The result of identification at 214 is that a particular program name or filename (e.g., notepad.exe) is known and a particular page number within that program or file is also known to correspond to the referenced page. Authentication at 212 may comprise determining that the referenced page is acceptable and should be authorized for execution (or blocked).

Identification at 214 may comprise determining a set of one or more pages that could correspond to the referenced page, as seen at 1004; for example, the same page may appear unchanged in multiple different versions of the same program. Authentication at 212 may involve determining that the referenced page actually does match one of the candidate pages. Authorization or activation at 216 may involve determining that the page database does not contain adverse information about the referenced page, and therefore that execution of the page should be allowed by changing the independent memory page permissions value for the referenced page to RX rather than RW, a change which also enforces W⊕X policy. The authorization at 216 may result in programmatically returning a result to the MMU, which marks the hardware-based memory page permissions (for example, in the EPT that Xen manages, or in hardware or software-based page tables that are managed by other hypervisors) for the same page as RX.

Identifying a page at 214, 1004 may involve the following. In an embodiment, identification at 214 is executed in a real-time loop that occurs while a page fault has paused the virtual CPU associated with a particular operating system. Thus, identification at 214 needs to occur rapidly to avoid introducing excessive delay, which may cause crashes arising from race conditions if, for example, one virtual CPU is waiting too long on another virtual CPU that has been paused. Unfortunately, identification may be non-trivial because a referenced page may contain non-deterministic data, relocations or other modifications that cause the referenced page at runtime to vary slightly in content from all other pages that are in the page database.

In an embodiment, the page database 208 comprises pre-computed representations or "fingerprints" of every page of every program that is expected to be used or considered useful to legitimate users of a computer that is protected by the techniques herein. Each page fingerprint comprises data for each range of fixed bytes in the page; in this context, "fixed bytes" refers to bytes within a page that are not data or not subject to change in different versions. Each page fingerprint further comprises an erasure mask derived from each range of variable bytes in the page; in this context, "variable bytes" refers to bytes within a page that contain data, relocations, or other values that may change over time, and an "erasure mask" refers to a marking that indicates that particular bytes are known to be variable such that the actual underlying content is ignored in subsequent analysis operations.

The resulting number of pre-computed pages may be quite large and a brute force comparison of byte values in a referenced page to byte values of all pages in the database 208, even ignoring bytes that are in the erasure mask, will take excessive time. While it is a valid approach, it is expected to be infeasible. Accordingly, a reduction approach is used to limit the number of pages that are considered.

In an embodiment, page oracle logic 210 is configured between the database 208 and the security logic; in an abstract sense, the page oracle logic 210 is configured to receive a referenced page and that returns a subset or list of one or more references to candidate pages that may match the referenced page. In an embodiment, the page oracle 210 manages a repository of hash values, comprising one or more hash values for each page in the page database. Each hash value is obtained from applying a particular range of bytes of a page to a one-way low-collision hash algorithm, such as SHA-1. For example, the page oracle 210 may create a hash value for the same 16-byte range of bytes in every page, and store the resulting hash in association with an identifier of the page.

However, pages that are subject to erasure masks may not be capable of hashing in this manner because the specified range of bytes may cover one or more elements of variable data that are within the erasure mask. Therefore, in an embodiment, the page oracle 210 also maintains a star list of pages, comprising for example a linked list of all pages that could not be hashed in the foregoing manner due to variable data or erasure masks. Thus, in an embodiment, the hash repository may be maintained for all known invariant pages, and the star list may be maintained for all pages that have erasure masks.

In this embodiment, identification at 214 involves first preparing a hash value for the referenced page at the same range of bytes that was used for other pages by the page oracle 210, and comparing the resulting hash value to all the hash values that are in the repository of hash values, as seen at 1005. Based on the comparison, the page oracle 210 provides a first subset of one or more matching candidate pages based on the repository of hash values, as seen at 1006.

However, the first subset may contain one or more false matches; a false match may occur when the specified range of bytes used to compute a hash of the referenced page happens to fall, within the referenced page, in an area of variable data. In such a case, the hash value may accidentally match a value in the hash repository but the referenced page is actually quite different than any corresponding page in the page database 208.

Therefore, as an additional check, a "brute-force", byte-by-byte comparison may be performed of the referenced page and all the candidate pages in the first subset by comparing all bytes in the page, as seen at 1008; the result is a match of the referenced page to zero, one, or more than one of the candidate pages. If an exact match occurs between the referenced page and one candidate page in the subset, then identification at 214 is complete and processing continues with the authentication at 212. Moreover, additional brute-force comparison of the referenced page to other pages in the database 208 can be precluded by pre-computing, at the time that the database is populated, information indicating that one or more pages in the database are known to match one another; then, at runtime, when hash matching and brute-force checking results in a single page match, that single page match will be automatically associated in the database with other pages that have been pre-specified as additional matches.

If the brute-force check against candidate pages in the first subset fails—there are no matching pages in the first subset—then the referenced page may be compared, on a brute-force basis, to each page in the star list, as shown at 1010. In some embodiments, checking the star list may involve testing many thousands of pages, which may require excessive time, storage space or message transmission space. Therefore, in an embodiment, before resorting to a brute force comparison of the star list, a second hash may be computed from a second range of bytes at a different location in the same page as the first range of bytes, for the referenced page and then used to retrieve a second subset of matching candidate pages from the star list, as shown at 1012. Thus, the system may additionally maintain a second hash repository for pages in the star list. If a second exact match occurs between the second hash for the referenced page and a second hash value for one of the second subset of candidate pages, then the process may conclude that a very high probability of a match exists, and return a success result.

Additionally or alternatively, a set intersection operation may be performed on the second subset of candidate pages from the star list and the first subset of candidate pages that are referenced in the hash repository, resulting in a third subset. Then, a brute-force, byte-by-byte comparison of the referenced page to each page in the third subset may be performed, as shown at 1014 of FIG. 10B.

Various combinations of hash value lengths, numbers of hash values and numbers of set intersections may be used in various embodiments. For example, two (2) 16-byte hashes may be used; sixteen (16) one-byte hashes with intersections may be used, etc.; thus the system may be driven according to tuning parameter values that are selected to have different values based on different performance goals or tradeoffs with respect to accuracy, time, and storage space.

In some embodiments, a first version of a particular application program may load into multiple pages of memory that are identical to those of a second version of the application program. Policy 220 associated with authentication at 212 might specify that executing the first version is allowed, but executing the second version is not. When the process herein is evaluating a referenced page that is used in identical form in both the first version and the second version of the application program, it becomes necessary to have different results with respect to authorization even though the referenced page is identical in form across both versions. Therefore, in an embodiment, additional processing time may be devoted to obtaining additional information to reach an authorization result for the referenced page.

2.5 Harvesting Processes, Remediation, Authorization, Execution

In an embodiment, referring again to FIG. 2, a harvesting process 218 may be used to gather additional information about other pages for purposes of guiding a decision on the referenced page. FIG. 11 illustrates parts of a harvesting process that may be used in an embodiment. In an embodiment, the security logic 112 may issue a request, such as to the hypervisor or other logic, to retrieve the next page currently in memory that follows the referenced page, or the preceding page. The retrieved page may be passed through the same process as previously described to determine if that page should be authorized and, if so, the result may be used to influence or determine the authorization result for the original referenced page. The process may be iterated for as long as processing time remains available to reach a result.

If the requested page is not in memory, a request list can be created of the requested page or other pages that are needed to complete an evaluation of the referenced page, and as seen at step 226, the authentication logic 212 may inject a kernel or guest-level page fault for each of the pages in the request list, typically one page fault at a time. When the hypervisor resumes execution of a virtual CPU, the virtual CPU will have been loaded with a page fault injected at step 226, as if a user-space program had taken that page fault even though an actual access to the requested page did not actually occur. In response, the operating system will run its page fault handler and load the requested page into memory and return control to the security logic 112. This process enables the security logic 112 to process the requested page, rather than re-processing the referenced page again, which would otherwise occur because the referenced page has not yet been authorized for execution.

Alternatively, at step 226, a sleep or yield instruction may be injected rather than a page fault to essentially buy time to continue processing the referenced page. In an embodiment, a timer interrupt or false interrupt may be injected. Any interrupt or fault that causes the operating system to make forward progress may be injected. Alternatively, if the type of operating system is known, then an OS-level system call may be injected. For example, with Linux or Windows, a sys-call instruction may be simulated. While the user will not see the application making progress, the operating system is, preventing a system crash.

Based on the information obtained as part of harvesting step 218, one or more changes can be made in the program as part of rewrites step 222 and/or remediation step 224. Alternatively, execution of the referenced page may be authorized at activation step 216.

Additional processing may occur in harvesting step 218 when the version of an application program for a particular referenced page is unknown, or when the identification step 214 results in zero matches, or low confidence matches, or incomplete matches, as seen at 1102 (FIG. 11). In any of these cases, as remediation step 224, the referenced page may be modified as a condition of allowing the page to run. In essence, reaching remediation step 224 means that so little information is available about a particular page that the page cannot be permitted to run, as it could have been hacked or modified with security vulnerabilities. Remediation step 224 is configured to obtain an authoritative answer to the question of whether a page should be allowed to execute, based on policy information, network information, or another repository of memory pages for application programs that are less commonly used or not expected to run. For example, the referenced page may be part of a newly installed application program so it may be necessary to consult a separate repository to get more information for an authorization decision.

In an embodiment, remediation step 224 runs in parallel to the operating system, thereby providing more time to complete remediation without causing a system crash.

In an embodiment, remediation step 224 triggers harvesting step 218. In this context, harvesting refers to using operating system logic to obtain more information from the operating system for the purpose of undertaking remediation of an otherwise unknown page of memory. In an embodiment, harvesting comprises introspection, involving reading otherwise private operating system data in the manner of a debugger, as shown at 1104. Additionally or alternatively, harvesting step 218 may involve issuing one or more queries to the operating system on behalf of the guest application program, as seen at 1106. For example, if the referenced memory page is part of a user space application program, harvesting step 218 may inject operations into the user space program as it is running; alternatively, binary instructions in memory of the guest program may be rewritten and allowed to execute. Page faults may be injected to cause control to return to security logic 112 after the injected operations or instructions have executed. For example, an N3 interrupt may be injected at the end of the injected operations or instructions and security logic 112 can register as the handler of N3 interrupts; consequently the security logic will be given control when the injected operations or instructions end execution.

Additionally or alternatively, the desired operations or instructions may be injected into another process that is concurrently running, for use as an agent of the security logic 112. For example, security logic 112 may, upon beginning execution, launch a separate "security audit" process that comprises a compact loop of code thus introducing little overhead. Thereafter, when harvesting is needed, instructions or operations may be injected into the security audit process. The use of such a persistent agent is particularly useful in the embodiment described above in the section entitled "EXAMPLE EMBODIMENT USING SPECIAL-PURPOSE HYPERVISOR WITH INTEGRATED SECURITY LOGIC," as this embodiment cannot provide direct network communication access for the purpose of gathering added information for use in an authentication or authorization decision.

The harvesting step 118 may involve gathering a wide variety of information. For example, harvesting may involve requesting the operating system to provide the name of the user space guest application program of which the referenced page is a part; requesting the structure of the program, such as the size of the binary, how much code is in the binary and how much data is present; obtaining build strings that were used to build the program; obtaining other metadata carried with an application program, for example, from Windows applications; obtaining the original binary of the program, for example by memory mapping a copy of the program into the program's application memory space, copying the memory from the hypervisor and retiring the memory map; identifying what shared libraries have been linked or could be linked; requesting content of the certificate store managed by the operating system to inspect a certificate associated with the program; and other values.

In an embodiment, a first sub step of harvesting step 118 comprises collecting information from the network by requesting information from network resources, as seen at 1108. For example, network information collection may comprise creating and sending a network broadcast request to other instances of security logic 112, or to one or more caches of memory page information, that provides a copy of the referenced page requesting whether any such nodes can identify the referenced page. However, such a request may yield a large number of responses and may be viewed as a last-chance step. Therefore, in an alternative, a network request may comprise an application program name and version number in association with a request to provide any or all of the data specified in the preceding paragraph. A network response may provide, for example, all information known to the nodes in the network about a particular application program by name and build number, or that the requested information does not exist. For example, if a request seeks information about a non-existent version of an application program that is referenced in a malicious memory page, the network may respond authoritatively that the requested information does not exist because the version number is unknown or invalid.

If no network connection is available or no network node responds, then based on policy 220, other steps may be taken. For example, the next step could be to check certificates associated with the program, to validate the certificates and allow execution if the certificates are validated successfully. In one embodiment, when no network is available, policy 220 could allow a program to execute locally if is associated with a trusted signed digital certificate, but to be marked for further evaluation when the network becomes available. This approach would allow a suspect program to locally run on the machine of an individual who has no network access, for example, during an aircraft flight, while ensuring that subsequent access triggers a re-evaluation of the program.

As a result of remediation step 224 and harvesting step 218, a program may be authorized for execution and activated at step 216. Alternatively, it may be necessary to request the user to confirm that the program should run. In one embodiment, a negative response from the user results in termination of the program at termination step 228. Thus, in an embodiment, authentication step 212 may be configured with user interface capability to open dialog boxes, windows, or otherwise issue prompts or queries to a user. In an embodiment, security logic 112 may take control of the display screen through the hypervisor in order to securely write messages to the screen. In one alternative, while the security logic 112 is awaiting a response from the user to a prompt about whether to allow execution, cause termination, etc., the operation of the entire operating system may be suspended; alternatively the operating system may be allowed to advance so that other user space application programs can continue to run. In still another alternative, security logic 112 may trigger termination step 228 autonomously and cause termination of the user program.

When the referenced memory page is part of a kernel space program, such as kernel driver that is in the process of loading, termination step 228 often will be able to unload the kernel driver. For example, in certain versions of Windows and Linux, loading a kernel driver calls an initial function which, upon receiving a return code indicating failure, automatically unloads the kernel driver. Therefore, a kernel driver may be shut down successfully without injecting a fault, which is normally not possible for a driver that is untrusted, by rewriting the harvesting step 218 to cause unloading in this manner rather than injecting a fault.

If the referenced memory page is part of corrupted core code, then remediation step 224 may involve patching the memory into a desired configuration or by restoring memory. For example, if the referenced memory page is found to have overwritten memory that was marked as not writable then the overwritten memory may be restored.

3.0 Creating and Using a Database of Memory Page Metadata

In an embodiment, techniques are provided for initially populating and updating the database depicted as repository 208. These techniques include techniques for loading certain programs into the database on execution; using a multi-tier hierarchy of databases or set of peer-to-peer databases to update local databases and provide superior program information and code; presumptive fetching and local cache management; and pausing or killing during updates. Particular techniques are provided for database population during absence of network connectivity and reconciliation after re-establishment of network connectivity and for database population based on machine images uploaded via data center orchestration tools; scavenging programs from images; and matching scavenged programs to updates from external databases In an embodiment, repository 208 comprises metadata or fingerprints for each memory page, and each fingerprint comprises a copy of a memory page and any erasure, or a cryptographic hash of an erased page and its erasure, and other metadata known to the system such as provenance data. In one embodiment, each fingerprint comprises information sufficient to describe the provenance of a memory page, such as the original executable file from which the page came, and where in that file the page came from; in some embodiments the fingerprint data may identify one or more programs to which the page belongs, a dynamic linked library (DLL) that created the memory page, or other information. The provenance data enables uniquely identifying a memory page, as the content of the memory page alone is insufficient to provide unique identification. Provenance data may include packages from which the memory page came, relationships of origin packages to other packages, such as upgrade packages, build versions, and similar information.

Provenance data may include reputation values that indicate a positive or negative security reputation for a memory page. Provenance data may include or reference time-to-live values that indicate when a particular memory page should be considered non-secure, expired or unavailable. One or more elements of provenance data may be stored in negative cache storage as further described herein.

FIG. 12 illustrates an example process of generating and processing memory page fingerprint data. Obtaining fingerprint data may begin by processing a binary executable to extract all possible memory pages that can come from that binary, effectively computing the form and content of all such pages as the executable would generate them for actual use, as seen at 1202. In an embodiment, information about the operation of the load process of a binary loader that would normally load the binary, such as the dynamic loader ld.so of LINUX, may be used to determine the in-memory layout of pages generated from the binary to enable correct population of the database and correct determination of fingerprints, as seen at 1204. For example, relocations may affect the structure of erasure masks.

Generating the fingerprints may be done in real time or in a pre-computation process. In one embodiment, generating fingerprints may be performed by performing actual loading of a binary and inspecting the results in memory, registers, or other sources, and then removing the actually loaded memory image, as seen at 1208. In another embodiment, the loading process may be simulated, as seen at 1210. In a simulation process at 1210, simulation logic that is based on known logic of an existing loader, such as an open source loader, processes a binary to determine how memory pages should appear in memory if they were loaded and then uses the resulting information to generate fingerprints. For example, the binary may be parsed to determine locations, offsets, segments, adjacencies, and other values.

Using these techniques, memory page fingerprint data of the type described above is created and stored, as seen at 1212. Generating the fingerprints may be done at a vendor or service provider associated with the security logic described herein, or at a customer of the service provider, or at personal computers associated with end users of the customer. In one embodiment, fingerprints for publicly available software, such as commercial software products or open source software, are computed centrally at a service provider and distributed to multi-tiered cache storage, as seen at 1214. However, equivalent computations may be performed at any other node in the system. In an embodiment, communications between nodes of the multi-tiered cache storage and other nodes such as service provider, customer, and end user systems use signed secure data communication channels with revocable digital certificates. These techniques enhance security and confidence in the system, and in other systems that rely on the fingerprint data for security decisions with respect to memory pages, by enabling the service provider to terminate use of fingerprint data that is determined to be invalid or expired, or in the event that signing keys are compromised. In this manner, endpoints such as customer security appliances may learn that fingerprint data is not to be used.

In one embodiment, a computer system at the service provider is configured to periodically search public networked sources, or other networked resources, to discover newly released software packages, or information about them, for use in generating updated fingerprints, as seen at 1216. In an embodiment, as further described herein and as seen at 1215, the system is configured with logic that can receive requests from client computers to return fingerprints about particular memory pages for use in security decisions about those pages; if the system determines that the repository 208 or other elements of the storage system do not contain the requested fingerprint data, as tested at 1217, control passes to 1216 and the service provider computer may initiate inquiries into the networked resources to obtain the requested fingerprint data. Thus, fingerprint data may be developed using periodic polling processes, or on demand in response to client requests.

In an embodiment, negative data may be cached, as seen at 1220. In negative caching, a particular memory page is known not to exist or to be invalid and the repository 208 does not contain a fingerprint for that page. Instead, the repository 208 stores metadata relating to the page and the metadata may be returned to a client in response to a request. For example, the harvesting logic described herein may use these techniques to compare a version number of a particular memory page with the metadata stored in the negative cache to determine whether the version number is invalid. This approach enables the harvester, for example, not to send futile messages to poll networked resources for more information about non-existent versions of software. Further, responses to queries seeking pages for invalid or non-existent versions of software may include references to negative cache information about the software.

All techniques described in this section may be performed at any appropriate computing element in a system. Although a multi-tiered storage system may be deployed by a service provider and managed in the manner described above, the techniques herein should be viewed as an overlay technology that can be integrated into any suitable computing node for which memory page security information is useful. The overlay technology may be deployed in a flexible manner that permits addition of new machines or nodes and notifying existing machines or nodes that new elements are participating in the overlay.

Unlike prior approaches such as DNS, the multi-tiered storage system herein may comprise any number n of caches that may be queried and any number r of root cache servers. An endpoint may select any of the cache servers or root cache servers to query and any of the cache servers may refer a query to any other of the servers in the system. A query may be represented to a different cache server at any time if another cache server is taking too long to reply. Thus, a cache miss is not required for a referral to a higher node and there is no requirement to follow a strict hierarchy of transmitting queries up tiers of servers, thereby improving scalability; instead a hierarchy is provided to support consistency of data rather than a rigid communication process. Further, endpoint nodes do not need to receive configuration data describing the network locations of the root nodes; the endpoint nodes can obtain access to the root nodes through the hierarchy by pass-through of failed queries. Thus, a hierarchical system is optionally available but its use is not required.

Cache content may comprise static data and dynamic data. Fingerprint data is static data and may be returned, for example, in response to a query that identifies a specified program or version. In an embodiment, dynamic data may be generated in response to a query to the cache, for example, that provides the complete contents of a memory page with a request to determine whether the page is known. In an embodiment, static data could be served from a first cache structure that uses content data network (CDN) techniques to rapidly serve data, and dynamic data may use, for example, Java dynamic queries to web servers.

Responses at 1218 from the storage system to client queries may take many forms. In an embodiment, a response may provide any of a substantive answer to the client query, or information indicating that no answer is available, or a cross-request for the client to re-present the query at a later time. Responses of any of these types, or others, also may include a cross-request for the client to provide additional information. For example, assume that a client requests a page from Mozilla Firefox 6.0. The storage system may interpret the query as implicitly indicating that the client does not have any information about Mozilla Firefox 6.0 and may respond by providing the requested page and also providing a pointer or URL referring the client to a list of all pages for that software, or by referring the client to another resource that has all pages for that software. The client then may elect to pre-fetch all the referenced pages for use in later requests. This approach reduces the amount of processing that the storage system otherwise would have to perform in response to multiple requests for related dynamic data.

Further, the approach improves performance under conditions that have high latency. For example, the approach allows the client to rapidly obtain all pages that might be needed later under conditions in which latency would otherwise result in slower replies to multiple requests for related dynamic data. As another example, clients are not required to perform pre-fetching, for example, by closing a connection or my declining to follow an indirect link to another networked resource. Clients may defer following such links using internal logic that schedules pre-fetching for a later time. The client may, at the client's option, open a stream connection for example to obtain the referenced pages without extensive round-trip messaging to the storage system's nodes. These approaches enable tuning the behavior of clients to different network latency conditions.

The approaches herein do not require synchronization of all cache nodes. Because the memory page data is write once data, consistency issues are not a significant concern and the typical issue might be lack of a complete set of memory pages. Responses from the storage system may indicate to clients whether the storage system is seeking to obtain a page that is not immediately available. All endpoints may be treated equivalently and some endpoints may implement cache storage of fingerprints and may generate dynamic data in the same manner described for other nodes above.

The approaches herein also provide resilience to lost network connections; clients may continue performing security evaluations of memory pages by using data other than fingerprint data to result in a security decision, or simply adopt a negative security decision and mark a page as unusable, perform remediation, or reach a "terminate" decision for the associated program. When network connectivity is restored, processing can resume with queries to and answers from the storage system. Consequently, obtaining a response from the storage system does not impede forward progress of clients.

Initial population of the database may occur according to a variety of approaches. In one embodiment, the repository 208 is initially empty and a client requesting a particular memory page results in the storage system obtaining information from network resources, generating the memory page and provenance data on the fly, and constructing a new entry in the repository while replying to the client or deferring the client. This approach may be used to construct a complete repository 208 over time.

In another embodiment, which might be used in environments where, for example, a network administrator knows that particular software is authorized for use in the enterprise, the administrator may identify one or more software packages or versions to the service provider and the security logic or other logic associated with the service provider may seek information from networked resources sufficient to result in generating entries in the repository 208 for that software.

In another embodiment, the security logic is installed on a particular computing device, for example, a laptop computer. The security logic scans all executable files or binaries on the laptop computer and schedules adding, to the repository, entries corresponding to those binaries. Thus, embodiments may be implemented in the context of installation of the security logic; when installation is complete and the laptop reboots, fingerprints for all the binaries on the laptop are available to the security logic either locally on the laptop or in a networked deployment of the cache storage system.

In yet another embodiment, the approaches herein are integrated into networked storage, such as a cloud storage system. For example, a file system of a computing device may be uploaded to the cloud storage system and security logic associated with the cloud storage system may automatically scan the binaries in the file system, generate fingerprints and store the fingerprints in the repository 208 or other elements of a cached storage system. In a related embodiment, when a computing device contacts the cloud storage system and requests downloading and using a particular image or particular executable software, prior to servicing the download request, the security logic of the cloud storage system may validate the requested image or executable in the manner previously described herein. Consequently, the computing device that is seeking re-imaging from cloud storage or installation of cloud-based software may be protected from threats or operational issues associated with that image or software on the fly or in a transparent manner.

4.0 Program Reorganization

4.1 Overview

In an embodiment, a computer-implemented method comprises obtaining access to computer program code; identifying a plurality of code segments in the computer program code based on any of static analysis and dynamic analysis; reorganizing the computer program code, resulting in creating and storing reorganized code, by re-ordering the plurality of code segments into a new order that is different than an original order of the plurality of code segments; wherein the new order is unpredictable based on the original order; rewriting one or more pointers of the reorganized code to point to new locations in the reorganized code consistent with the order of the reorganized code; wherein the method is performed by one or more computing devices.

In an embodiment, the reorganizing comprises moving one or more functions to randomly selected new locations within the reorganized code.

In an embodiment, the reorganizing comprises reorganizing a plurality of instructions within a particular code segment by any of swapping instruction locations, relocating instructions, or spacing instructions by inserting a randomly selected number of no-operation instructions.

In an embodiment, the reorganizing comprises substituting, in the reorganized code, randomly selected identifiers of registers that are referenced in the computer program code.

In an embodiment, the reorganizing comprises modifying an order, within a stack, of local function variables and adding randomly selected padding bytes in the stack.

In an embodiment, the rewriting comprises rewriting instruction pointers to point properly to locations within the reorganized code that correspond to original locations in the computer program code, and rewriting data segment pointers to reference new locations of data segments in the reorganized code.

In an embodiment, the method further comprises repeating the method periodically while the reorganized code is in memory.

In an embodiment, the new order is pseudo-random.

In an embodiment, the method further comprises retrieving stored information indicating the new order that was used in a previous reorganization of the reorganized code; selecting a different new order that is unpredictable; updating the stored information to indicate the different new order; again reorganizing the reorganized code according to the different new order.

In an embodiment, the method further comprises detecting that a computer is loading a dynamic loader; allowing loading the dynamic loader into memory and then suspending operation of the dynamic loader; modifying the dynamic loader in memory to redirect one or more system call instructions of the dynamic loader to cause referencing the reorganized code; updating a binary header of the reorganized code to reflect the new order; allowing the dynamic loader to load the reorganized code based on the binary header after the updating.

In an embodiment, the modifying comprises modifying one or more file OPEN calls to redirect the dynamic loader to a different file that contains the reorganized code.

In an embodiment, the modifying comprises: creating and storing a private memory map for the reorganized code; detecting that the dynamic loader has issued an OPEN system call; in response to the dynamic loader issuing a READ or MMAP system call that correlates to the OPEN system call that was previously detected, intercepting the READ or MMAP system call and returning a portion of the reorganized code based on the private memory map.

In an embodiment, the method further comprises, in response to the dynamic loader issuing a READ or MMAP system call that correlates to the OPEN system call that was previously detected: modifying the READ or MMAP system call to comprise a memory allocation call; storing, in memory allocated as a result of the memory allocation call, a portion of the reorganized code.

In an embodiment, the method further comprises detecting that the dynamic loader has requested a shared memory map of a file; modifying the shared memory map to a private map call with no file; storing, in memory allocated as a result of the private map call, a portion of the reorganized code.

In an embodiment, the method further comprises using a shared private call or shared memory call to allocate and name shared memory.

In an embodiment, the method further comprises rewriting a plurality of pointers to reference a non-shared segment of data that is configured to remap the pointers to particular locations in the reorganized code.

In an embodiment, the method further comprises enabling an inherent random segment loading capability of the dynamic loader, in response to detecting that the computer is loading the dynamic loader.

In an embodiment, the method further comprises storing a backup copy of the computer program code; during execution of the reorganized code: setting memory page permissions of all pages of memory of the reorganized code to not readable, not writeable, and executable; in response to detecting a trap resulting from an attempt to read or write a particular one of the pages of memory of the reorganized code, returning an original page from the stored backup copy of the computer program code that corresponds to the particular one of the pages of memory of the reorganized code.

In an embodiment, the method further comprises storing locations of function pointers in the computer program code; retrieving stored information indicating the new order that was used in a previous reorganization of the reorganized code; selecting a different new order that is unpredictable; updating the stored information to indicate the different new order; again reorganizing the reorganized code according to the different new order to result in newly reorganized code; identifying, using a pattern recognition method, one or more pointers on a stack; re-aligning the one or more pointers on the stack, based on the stored locations of the function pointers, to reference corresponding locations in the newly reorganized code.

In an embodiment, the method further comprises detecting one or more re-aligned pointers that jump to non-existent locations in the newly reorganized code; determining whether to allow or block execution of the re-aligned pointers that jump, based on detecting whether the computer program code has been repeatedly re-organized.

4.2 Detailed Description

In an embodiment, the security logic herein implements processes for performing computer program reorganization. In one embodiment, a reorganization process comprises using analysis on code, statically and/or dynamically, to extract enough information to reorganize the code within the segments in an unpredictable manner, and then to possibly further rearrange the behavior of the code; reorganization on the file, within memory, at load time or in advance or just-in-time, for every invocation of the program, or on a periodic or demand basis; reorganization by relaying out a binary (or producing a new one from a previous binary and/or source), and/or producing modifications to the binary, reorganization at the function level, instruction level, or at the stack, memory access, and register level.

In one embodiment, computer power is used in a multi-tiered architecture to perform reorganization.

Many attacks against computer programs take advantage of knowledge of the organization and structure of the program, as it is expected to be loaded into memory by the operating system, to craft attacks that have either a certain or probabilistic ability to redirect or compromise the behavior of the program. Attacks such as return-to-libc, heap smashing, and even heap spraying fall into this category. Techniques such as Address Space Layout Randomization allow dynamically linked binaries to have unpredictable locations of their stack, heap, and code segments. This thwarts some attacks, but because the code within what are rather large linkage segments is not modified relative to itself, an attacker can take advantage of techniques such as relative-offset attacks or trampoline leakage to craft attacks that continue to work in these environments.

Figure 4:
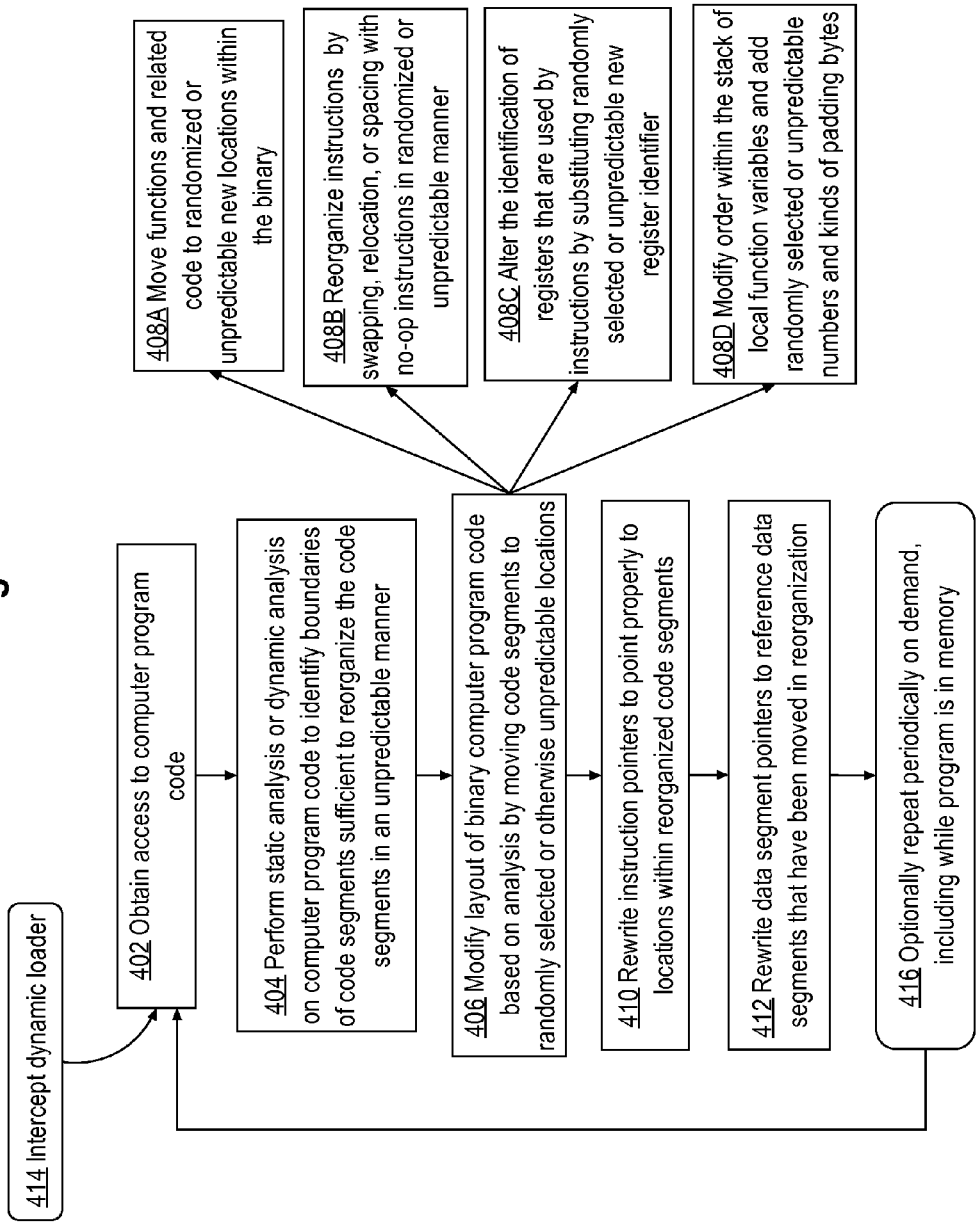
FIG. 4 illustrates a process of reorganizing virtualized computer programs in a randomized or unpredictable manner for security purposes.

FIG. 4 illustrates a process of reorganizing virtualized computer programs in a randomized or unpredictable manner for security purposes. FIG. 4 and other process diagrams discussed in this section may be implemented in security logic that analyzes and processes other computer programs for security purposes as previously described. At block 402, access is obtained to computer program code. Block 402 represents the process receiving information to identify an executable or binary in a stored file or in a particular memory location for analysis and modification according to the process. One embodiment uses analysis on the binary and/or source code, statically and/or dynamically, to extract enough information to reorganize the code within the segments in an unpredictable manner, and then to possibly further rearrange the behavior of the code. Thus, as seen in block 404, the process performs static analysis or dynamic analysis on the code that was obtained at block 402 to select boundaries of code segments and to obtain information sufficient to reorganize the code segments in an unpredictable manner. The unpredictable reorganization may occur on the file, within memory, at load time or in advance or just-in-time, for every invocation of the program, or on a periodic or demand basis. The reorganization is performed by relaying out a binary (or producing a new one from a previous binary and/or source), and/or producing modifications to the binary. Thus, as shown at block 406, the layout of the binary computer program code may be modified based on the analysis.

As seen at block 408A, reorganization may be at the function level, in which case functions are shuffled throughout the code segments—calls to functions are adjusted to preserve the abstract control flow graph. As shown in block 408B, reorganization may also be at the instruction level, with instructions swapped, relocated, or spaced out with no-op instructions, to prevent perfect knowledge of the specific mapping of pointer to instruction. Finally, the reorganization may occur at the stack, memory access, and register level. As shown in block 408C, register-level reorganization involves altering which registers are used by instructions to prevent ahead-of-time attacks that depend on specific register values: one example of this reorganization would be to replace the use of % rax with an unpredictable register. As shown in block 408D, stack or memory reorganization includes shuffling the order within the stack or memory of local function variables, and optionally adding padding bytes that are unpredictable as to number and location.

Embodiments thus provide the alteration of the code, and cover all combinations of performing it ahead-of-time, at load-time, and during the running of the program.

In an embodiment, OS-exposed code modification or code rewriting in two types are provided; a first type involves modifications of an underlying program that are visible to the OS and a second type of modifications are not visible to the OS. Embodiments with invisible changes are useful to provide for patching code on the fly, inserting interception traps, and other injections of logic that allow taking control. Visible changes may comprise material changes that are useful for the OS to detect. Program reorganization is an example of visible change that is useful for improving security when function pointers in the program can be known in advance or computed. For example, program reorganization may include moving function pointers around in the program so that if an attacker pre-computes a function pointer, the attacker's pre-computed function pointer is likely to be wrong with high probability, thereby thwarting the attack.

In an embodiment, reorganization involving moving function pointers is hidden with respect to the OS. For a program that is laid out as a code segment followed by a data segment, with the segments located at fixed or arbitrary addresses, embodiments can prevent an attacker who knows a pointer in one segment from accurately computing another pointer into a different segment, to prevent an attacker from being able to accurately determine the layout of the program. Thus if the exact code reorganization changes are exposed to the OS, then the purpose of reorganization would be defeated because an attacker could learn the layout of the reorganized program. Therefore, the techniques herein provide for segmenting a program into many different segments that are reordered or otherwise reorganized so that the operating system cannot respond to an attacker by providing a core dump of the program in the same form in which the OS originally loaded the program.

In an embodiment, as seen in block 404, static or dynamic code analysis is used to determine where to break the program into blocks or chunks for purposes of reorganizing the chunks into different locations. Further, pointers that reference the chunks are rewritten to correctly point to the reorganized chunk locations, as shown in block 410. For example, a relative JMP instruction referencing a particular segment location must be rewritten to point to the correct location in a chunk after the chunk has been moved. Data pointers in the data segment may be rewritten in the same manner to correctly reference moved chunks, as shown at block 412.

Existing techniques for static or dynamic code analysis may be used to determine chunk boundaries; for example, basic block analysis may be used in which code is divided into segments termed basic blocks that contain no jump instructions or pointers, and the particular technique used to determine chunk sizes or boundaries is not critical. However, in an embodiment, the process of chunk reorganization is performed starting at block 402 without rewriting a copy of the executable program binary that is stored on disk; this allows users to install and run programs in the same manner that the users originally received the programs without concerns that might arise from modifying original files that have been backed up in a different form, or other issues.

Figure 5:
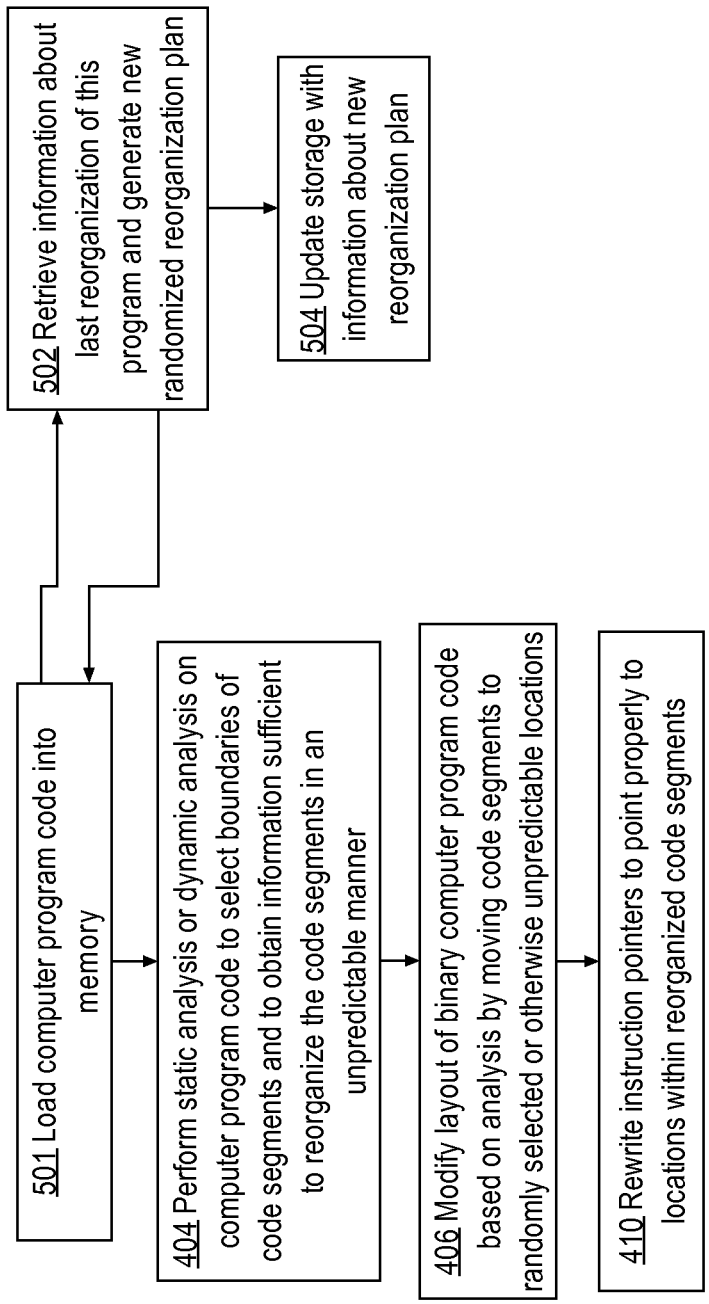
FIG. 5 illustrates a process of variably randomizing the reorganization of a computer program upon each memory load of the program.

Further, in an embodiment, initiation of the process at block 402 and the performance of random reorganization of code chunks may occur every time that a binary is loaded into memory, and more often in other embodiments. FIG. 5 illustrates a process of variably randomizing the reorganization of a computer program upon each memory load of the program. In an embodiment, each time that a binary executable computer program file is loaded into memory, it is stored in a randomized set of code or data chunks and the randomization is different for every load instance. At block 501, computer program code is loaded into memory. At block 502, the process retrieves stored information about the last reorganization of the loaded program, and generates a new, randomized reorganization plan. For example, block 502 can involve the security logic retrieving, from a database, based on the filename of the loaded code, a list of segment boundaries for the code and the order in which the boundaries were reorganized at the time of a previous load. Thereafter the security logic may be configured to generate a new randomized order for the segments. At block 504, the new reorganization plan reflecting a new randomized order of the segments is stored for future reference. In this approach, a user running the same program multiple times at the same time causes the security logic to randomize each of the two program copies in different ways, preventing a first load from leaking information about its organization to the second load. Alternatively, the determination of code chunks and the determination of a randomization sequence for the chunks, as in FIG. 4, FIG. 5, may be performed prior to program execution in a pre-computation step.

An OS may load a program in two different ways. For example, with UNIX, the kernel loader program calls a basic loader, which is a kernel-space program; it executes an interpreter the name of which is known or hard-coded into the loader. The basic loader does not deal with symbols or relocations. In contrast, a dynamic loader executed in user space can process symbols and relocations as well as shared libraries and other elements of a program. In an embodiment, the dynamic loader is intercepted, as shown at block 414 of FIG. 4, so that when the dynamic loader seeks to open a program to be executed, the system calls of the dynamic loader that perform file access (for example, OPEN a file, or MMAP—map a file into memory) are intercepted and remapped in any of several ways to change the results.

Although certain specific system calls are described in this section, the approaches herein may be used with any mechanism for interacting with libraries, operating system facilities, or similar system elements. While READ, OPEN, and MMAP calls are specifically described as examples, the approaches herein may be used with any means for reading, means for opening, means for populating memory with the contents of a file.

FIG. 6 illustrates a process of intercepting dynamic loading and responding to dynamic loading for security purposes. Various forms of interception may be used. For example, at block 602, the loading of the dynamic loader is detected; in an embodiment, loading of the dynamic loader may be detected using the security approaches above for hypervisor implementations in which every page of memory is identified, authenticated and authorized. In other embodiments, a particular system call of the OS, such as PTRACE, may be used to receive notification when other system calls are being made by programs. At block 604, the security logic allows the dynamic loader to be loaded and also invokes the processes of FIG. 4 and/or FIG. 5 to perform randomized reorganization of the code of the program that the dynamic loader intends to load. At this time the operation of the dynamic loader may be suspended or temporarily halted to permit subsequent blocks of FIG. 6 to accomplish modification of the dynamic loader and reorganization of the program code.

In an embodiment, the dynamic loader directly invokes system calls and therefore the security logic may insert breakpoints or traps in the dynamic loader in place of the system call instructions, at the time that the dynamic loader is loaded into memory. As shown at block 606, in an embodiment, the security logic redirects the system call instructions in the dynamic loader to cause loading only the reorganized code that was generated by the process of FIG. 5, FIG. 5. Redirecting the system calls may involve changing the meaning or result of the system calls.

Changing the meaning or result of system calls may be done in two ways: with file redirection and without. The goal of both is to allow the dynamic loader to attempt to load, for example, the /bin/bash file into memory but when that load is attempted, the dynamic loader actually receives a different item in memory, namely the modified or reorganized code.

As shown at block 608A, redirecting system calls may involve file redirection that change the result of OPEN, READ, and MMAP calls. For example, by intercepting an OPEN, at block 606 the security logic can redirect the OPEN to a different file that contains the modified or reorganized code. For example, an attempt to load /bin/bash may result in actually loading a file named /bin/temp1. The redirection may result in loading a static part of the file or a dynamically generated code chunk; for example, the /temp1 file might have been dynamically created for immediate use and then may be flushed from the file system. In another approach, the loader is redirected to something else. For example, the OPEN call may be redirected on a second call to the same file /bin/temp1 or to a different file /bin/bash2 where /bash2 and /temp1 have been reorganized or modified differently.

In an embodiment, the meaning of the system calls may be changed completely and no redirected files are used as in the above approach. For example, as shown in block 608B, a private memory map may be used to deliver the contents of the reorganized code, in response to an OPEN call followed by a READ or MMAP call, rather than the contents of the memory that was originally referenced in those calls.

In this approach, when an OPEN of a file such as /bin/bash occurs by the dynamic loader, the security logic creates and stores a record or indicator that the OPEN occurred. Thereafter when the dynamic loader performs a READ or MMAP call, it is correlated back to the OPEN, and the security logic serves in response to the READ or MMAP call the contents of a different, modified or reorganized file that the security logic has created and manages. For example a READ of the first 528 bytes of a file will be intercepted, failed, and the security logic will populate the requested buffer with data determined by the security logic, and then forge a return from the READ to make it appear as if the READ completed normally. The contents of the buffer may be determined on the fly or precomputed. Further, because MMAP calls normally involve physical memory that is shared among two or more programs, the security logic may request instead a completely private map or may issue one or more forged or synthesized MMAP calls that the security logic issues on behalf of the dynamic loader. Moreover, in an embodiment, all results returned as a result of intercepting READ and MMAP calls are kept consistent with the memory map that the dynamic loader constructed as a result of reading the ELF header of the program, principally by keeping the intercepted MMAP calls as private.

An intercepted MMAP call may lead to any of a plurality of different private memory maps that allow multiple different processes to reference different physical memory. In an embodiment, intercepting an MMAP may result in changing the MMAP call to a pure memory allocation call and populating, in the allocated memory that is the target of the changed call, the contents of the randomized or reorganized code. This process may be repeated for every MMAP call that is in the dynamic loader.

In an embodiment, when the dynamic loader requests a shared memory map of a file, the security logic changes it to a private memory map with no file, effectively merely allocating memory of the correct size without also mapping the memory to a file. The security logic then populates the allocated memory with the contents that the security logic wishes to provide, based on the chunk reorganization or modification, as if the chunks came from the file.

An optimization may be applied to the foregoing approaches to enable two or more programs to share the same memory. In an embodiment, the memory allocation performed by the security logic results in allocating memory that is shared but not backed by a file, using an operating system call that the OS provides for that purpose in other contexts. Shared private or shared memory (for example, SHMGET) calls may be used to allocate and name shared memory. In effect, the reorganized or modified chunks are mapped to multiple programs for shared use. This approach is effective because the sharing is effected after the reorganization or modification is performed.

Another approach is to make pointers position independent so that all pointers look to a non-shared segment of data that remaps the pointers to particular targets in reorganized or modified chunks. The mapping may be similar in form to a global offset table, while used for an entirely different purpose relating to security.

Reorganization may be accomplished in a variety of ways. For example, the memory map of the underlying program may be executed or formed in temporary memory controlled by the security logic to determine the program organization, the memory map may be reorganized in a random fashion, memory may be allocated for the random reorganization, and then the underlying program may be loaded into memory according to the reorganized memory map.

Referring again to FIG. 6, the process may continue with code analysis in the manner of FIG. 4, block 404. In an embodiment, upon determining the boundaries of chunks and pointers in the chunks of the underlying program, a particular original program segment may be mapped into multiple n target chunks. That is, each program segment that is identified in the header of the binary may be divided into two or more chunks, thus sub dividing the program into finer grain chunks than the header originally declared. The header may be rewritten or otherwise stored to reflect the fine-grained chunk divisions, as shown at block 609. Thereafter the dynamic loader may perform ordinary loading based on the updated header, as shown at block 610, effectively causing the dynamic loader to perform the work of allocating memory and loading program instructions or data into the fine-grained chunks that the security logic defined. This approach permits the dynamic loader to resolve inter-segment linkages and perform other difficult tasks without the involvement of the security logic in the load process. In effect, the security logic directs altered operation of the dynamic loader to cause the loader to load the program in a reorganized manner by creating the boundaries of chunks and exposing the new boundaries to the loader.

In some embodiments, the dynamic loader may have inherent random segment loading capability and the security logic may turn on that capability to cause the dynamic loader also to determine random memory locations for the reorganized or modified chunks. Alternatively, the program header may specify randomized address locations for loading that have been modified in the header by the security logic. A benefit of this approach is to enable programs to continue using dynamic loaded libraries, which will be processed by the dynamic loader correctly.

In a WINDOWS embodiment, the kernel operates as a loader but API calls may be intercepted and API responses may be forged for the same effect.

Referring again to FIG. 6, in an embodiment, validation of linkages of code chunks may be performed, as shown at block 614. For example, the approach herein enables the security logic to determine whether a particular process is allowed to load another process. In concept, the security logic is positioned in the loading process, using the techniques herein, at a logical location that enables intercepting and inspecting all program or process loads and determining whether the loads should be permitted. The logical position of block 614 as shown in FIG. 6 is provided as an example, but validation could occur at other times.

In combination with identification, authentication and authorization of all memory pages as previously described, the processes described in this section provide a powerful program security solution. Further, the combined system is capable of detecting the difference between a first program loading a second program using the dynamic loader, and the first program allocating memory and populating the allocated memory with executable code, and different security decisions may be made for each scenario. For example, the security logic could prohibit the program's own executable memory from executing, effectively requiring use of the loader; as another example, the loader may enforce various security policies to prevent one process from completing an undesired or unusual load of a second process.

In an embodiment, the security logic can intercept the kernel's attempt to load the dynamic loader, and load a different loader instead, as shown at block 616. In this scenario, the security logic can load a different loader that supports various features useful for security purposes that otherwise were unsupported in the native dynamic loader of the OS, such as inherent chunk randomization. For example, an embodiment may implement an efficient, rewritten loader for purposes of the techniques herein that does not require, for example, intercepting and rewriting OPEN or MMAP calls but simply implements secure behavior for those calls. This approach may be exposed to the OS, or not. For example, transparent replacement of the dynamic loader may involve detecting that the kernel is loading a native dynamic loader and then placing custom loader code into the same memory regions that the OS had allocated for the native dynamic loader. This may be appropriate for situations in which the native dynamic loader is suspected of malicious modification. Alternatively, the binary file representing the native dynamic loader may be modified on disk or other storage, which may have the benefit of greater efficiency since the dynamic loader typically is always loaded by the kernel from the same location.

In an embodiment, OS transparent rewrites may be performed using the I/O MMU approach described above, to protect memory that has been modified, as shown at block 618. Assume for a given page that R, W, X permissions exist and the page can be made not readable and not writeable so that the page is executable only. In an embodiment, pages of program code chunks are stored in copies for backup purposes, set to executable only, and then modified or reorganized as desired in any of the approaches; thereafter when the OS attempts to read or write the pages, a trap is thrown and the security logic may intervene to restore the content of the pages as they existed when the OS originally loaded the pages. Thus, in processing the trap, the security logic returns to the OS the stored backup copy of the original page.

This approach enables implementing modifications or rewrites of program chunks in a manner that the OS cannot detect, while returning to the OS the page that the OS expected, and while still ensuring that the computer only executes a safe or modified version of the program chunks. Consequently, modifications that are performed for security purposes will not adversely affect OS or program behavior that is dependent upon reading the original version of a particular page, preserving the integrity of the execution stream. Applications such as WINDOWS PatchGuard may benefit from or require such an approach to ensure proper results. These approaches may be implemented for multiple backup versions of the page, such as an original version, a first modified version, etc. A complete split memory system may be implemented on a page-at-a-time basis.

Program reorganization or modification may be performed periodically or on demand, as seen at FIG. 4, block 416. In an embodiment, a second reorganization or modification of the program may be performed while the program is in memory, provided that the location of all function pointers is known. In an embodiment, the location of all potential function pointers is determined from the binary analysis step, and the locations may be stored in one or more offset tables or other look-side tables that identify the locations of pointers that are static code transitions, facilitating moving the pointers. Memory segments of the program may be moved using OS memory move calls. The loader's relocations may be redone because they are known based on the ELF header; for example, virtual tables for C or C++ classes comprise static relocations that can be updated to reflect chunk movements.

However, the heap or stack may contain function pointers that are aligned to the old code. In an embodiment, function pointers on the stack or heap may be detected by identifying a portion of the pointer value that is repeated with only a few bits of variation. For example, 64 bit pointers may not use all 64 bits to represent an actual pointer value; instead, after an initial round of randomized reorganization, each pointer will comprise a range of bits that have been substituted with the same randomized value and the remainder of the pointer represents the actual relocated pointer value. The effect is that all pointers in a segment have the same large prefix value followed by a smaller range of actual value bits. Thus, if multiple instances of the same range of bits can be identified, the security logic can know with confidence that pointers have been found on the stack, even when the actual value of the randomized bit range cannot be known in advance—because it was selected, but not stored for security purposes or otherwise not made available, in the earlier randomization step. Therefore, in an embodiment, heuristic techniques are used to detect the prefix parts in repeated instances to yield a result, to some degree of confidence, that pointers have been recognized; the pointers then can be rewritten to reflect a second relocation, modification or randomization of the program.

These techniques may yield false negative results in which execution of the program after the second rewrite causes a pointer to jump to a non-existent chunk of the program. In an embodiment, the security logic is configured to detect such a jump and to consider whether the requested jump represents a false negative from repeated modification. The program may elect to satisfy the jump instruction or block it based on knowledge of whether prior modification or randomization had been done. For example, the security logic may look ahead in the program code to the target of the jump and attempt to determine if the next instructions to be executed bear a relationship to the instructions that were just executed. If so, then the jump may be allowed. For example, if prior instructions represent mathematical operations on a particular register and the target of the jump appears to use the same register in a reasonable manner, then the jump might be allowed. In contrast, if the target of the jump is a memory page that is suspicious or has been marked not for execution, then the security logic may elect to block the jump. The logic to implement these heuristics may be based on knowledge of the executable binary content when the binary originates from known source code such as open source modules.

These techniques also may yield false positive results in which the security logic erroneously identified an item on the stack as a pointer, for example, because the item merely happened to match the expected prefix value. These results are expected to be so rare that special processing is not necessary.

5.0 Applications to Interpreters

In one embodiment, the techniques otherwise described herein may be applied to computer program interpreters, for example, for one or more of: limiting interpreter operations; authenticating script files against database; preventing unauthorized script files from being interpreted; overlaying interpreters; interpreter-specific remediation steps. Interpreters are programs that open files, parse the contents of the files to result in generating executable instructions, and execute the resulting instructions.

In an embodiment, the techniques above are applied to interpreted programs by placing in the repository 208 all scripts that are to be interpreted and that may have adverse consequences. For example, a script that points to a file that is to be executed may be processed by inspecting the file to determine whether it has been modified from the original. In an embodiment, the security logic is configured to intercept an attempt by an interpreter to open a file, to open the file independently and read the file, and to validate that the file contains expected contents. If the file does not contain expected contents, then the interpreter or the script may be terminated.

If the file does contain expected contents, then the file may be marked in the file system or in memory as not writable or marked with a read lock so that the security logic is exclusive to writes, and then let the interpreter run to completion because all subsequent read operations are known to be correct.

In an embodiment, each read operation by the interpreter on the referenced file is monitored, and the seek offset into the file that the interpreter issues is compared to an expected seek offset value to determine whether the read is valid. For example, if the interpreter requests reading a particular set of bytes from a specified offset, the security logic may inspect the resulting buffer that the OS provides to determine if the contents match expectations. This approach ensures that interpreters or interpreted scripts can only execute files that have been identified, authenticated and authorized using the techniques described herein that the security logic implements and manages. In this approach, the same processes described above for intercepting READ or MMAP calls may be used in the case of interpreters, and the techniques described above for implementing fingerprints may be used to validate the correctness of a referenced file.

In an embodiment, aspects of the security logic may be injected into the interpreter rather than implementing the techniques herein in separate security logic. For example, the interpreter may be loaded and then modified in memory to implement the functions of the security logic herein before the interpreter is permitted to start executing, loading a script or interpreting the script. Consequently, modification of a script can be readily detected and scripts seeking to execute referenced files can be controlled.

6.0 Applications to Just-In-Time Compilers

In one embodiment, the techniques otherwise described herein may be applied to computer program just-in-time (JIT) compilers, including one or more of: disparate treatment of JIT-created and static binary pages; intercepting and policing system calls; memory location-specific and code-origin specific permission limitations.

JIT programs operate by interpreting, parsing or reading code that is not directly executable, such as byte code or other intermediate code expressions and producing executable instructions on the fly for execution. Therefore, in the address space of a static binary of a program, the JIT compiler creates a new segment of memory, fills that memory with executable instructions, and jumps to those instructions. JIT compilers may comprise both interpreters for general processing of byte code and compilers for optimization purposes. For example, the JIT compiler may initially interpret a particular sequence of byte code (e.g., in JavaScript) but determine that the sequence is undergoing repeated interpretation. In response, the JIT compiler can convert that sequence into compiled executable code for more rapid execution in later iterations without interpretation. Additionally, or alternatively, trace optimization may be used in which a trace of a large number of operations may be converted to compiled executable code, with or without regard to basic block organization of the program.

Consequently, JIT programs create executable instructions in memory that need to be checked for security purposes. In an embodiment, the memory that the JIT programs allocate for use in storing newly generated executable code is marked as not executable; therefore, when the JIT compiler attempts to execute that memory, the security logic could take the same kind of execute fault as has been described previously with respect to other kinds of executable programs. However, operation of the security logic as described so far would not succeed because the security logic would have no matching memory page in its repository to match to the memory that the JIT compiler had allocated, because by definition that memory and its contents are dynamically generated and not previously known to the system. Therefore, the repository 208 cannot hold fingerprints of JIT-generated executable memory pages.

In an embodiment, the security logic is configured to recognize that a memory page is a JIT-generated page and, in response, to disallow the invocation of all system calls by instructions of that page. Examples of system calls may include SYSCALL or INT80 calls. The instructions can be recognized because the security logic is configured to detect a JMP by the JIT compiler, which must contain a valid pointer that then can be used to identify the subsequent instruction stream. Once a valid pointer into the memory page is known to the security logic, the entire instruction stream of that page may be inspected and monitored.

In an embodiment, operations other than system calls may be disallowed. For example, hard-coded manual jumps to invalid or prohibited locations may be disallowed. An example is a static jump to code that is within a PLT or that is outside the binary of the original program, in a system library or other support library. In an embodiment, the JIT-generated page of code may be analyzed to determine whether it contains instructions that compute indirect pointers and the targets or placement of the indirect jumps may be reviewed and used as the basis of security decisions.

Recognizing JIT-generated pages may be performed using various techniques. In an embodiment, page signatures are used; for example, the security logic may recognize that a page has been marked as executable and the security logic may be aware that only JIT programs request the OS to mark pages as executable. Thus, the presence of an X permission may signify that a page is JIT-generated. Another approach may be to detect that an MMAP call has originated from an executable that is known to be a JIT, based on a fingerprint of that JIT in the repository 208 or metadata identifying the executable as a JIT. Another approach is to detect that the MMAP requested creating writable code memory; such a request is highly correlated to JIT-created memory pages, or at least memory pages that other programs want to be executable.

Additionally or alternatively, another alternative is to correlate the memory page to the executable that created it based on the knowledge that only specified programs actually contain or use JIT compilers. For example, most operating systems or word processing programs do not natively provide a JIT, but almost all browser programs do. Therefore, if a program that is known to have a JIT is involved in allocating memory for executable code, the resulting allocated pages automatically may be subjected to special JIT security processing as described above. Alternatively if a memory page is within the address space of a program that is known to have a JIT, then execution of that memory page may be allowed.

The security logic may be configured to allow the page to have R, W, X permissions or others. Thereafter, a second pass of security checking may be performed using the techniques described above for processing pages from other programs. Additionally or alternatively, if the security logic detects that the JIT has modified an executable page, the page may be subjected to re-validation using the techniques described above.

Detection of JIT-generated pages also may be performed using a stack trace based on the recognition that known functions are used to invoke JIT code, provided that the stack is trusted. For example, a browser that implements a JavaScript JIT will invoke various functions through a function invoker, which ultimately jumps to the JIT. When the JIT takes an execute fault, the security logic can inspect the stack backwards and identify earlier executed instructions representing the source of the JIT execution. If the source is recognized then further execution of the JIT may be allowed. Validation may be applied to all of the stack or some of the stack.

Consequently, embodiments are effective against JIT slamming attacks in which a JIT is invoked by malicious code to cause the JIT to inject other executable code into the memory space of an application in a known location to which a transition is made using an arbitrary jump instruction. In an embodiment, an execute fault is taken on the newly created page, and the security logic performs a back trace on the stack to determine whether a valid return address is present on the stack from a properly formed jump instruction that is seeking to return control to a proper JIT after the code is executed. If not, then an attack can be suspected and remediation steps may be taken.

Still another embodiment may involve determining whether the executable code page has other than an expected or ordinary exit point. For example, a return to the instruction that called the JIT, or an invocation of another function, e.g., a JavaScript function to perform various I/O operations may represent expected or ordinary exits. These exits are found because the JIT-generated code according to sandboxing principles is not permitted to make direct OS calls and therefore various special functions must be implemented by returning control to the JIT to perform them. The memory page may be scanned to determine whether proper exit functions are present and if so, execution of the page may be blocked.

In another embodiment, the entry point to the JIT-generated code may be validated and upon successful validation the JIT-generated code page may be made executable and all other pages associated with the JIT may be made not executable. Therefore, the security logic will have control of the other pages when execution of the first page ends and a return or jump occurs. When the JIT exits, the exit point may be validated and if it found to be valid, then the JIT-generated page is marked as not executable and all other pages are marked as executable. In an embodiment, the preceding functionality may be implemented by modifying values of page tables; for example, a shadow page table may be maintained to manage or track the page state or access permissions associated with JIT-generated pages. The shadow page table is consulted when the JIT compiler jumps into JIT-generated code pages and the shadow page table is not used for security logic operations on non-JIT-generated code pages.

In another embodiment, additionally or alternatively, the security logic may disallow execution of particular kinds of OS calls that are within JIT-generated executable code pages. For example, system calls or library calls may be blocked while still allowing static transitions; this approach allows tuning the level of security to the level of threat perceived in the system or programs.

For open source JIT compilers such as those in Safari, Chrome, and Firefox, open source documentation and source code are available that provide complete information on JIT operations and may be used as a basis of determining valid entry points, exit points, and other data in support of the foregoing techniques such as when and how memory allocation, modification, and retirement occurs. These data and knowledge of behavior may allow backing off various techniques herein because the behavior is known to be acceptable.

In an embodiment, any of the foregoing techniques may be implemented by rewriting the original application program, including a browser that provides a JIT, with new code that implements the security logic rather than performing the specified operations using a hypervisor or other OS, and setting the page types or access permissions for all pages associated with the security logic to a fully locked-down state that is fully controlled by the security logic. This approach promotes or lifts the techniques herein in a manner that may not require the use of page table permissions at all or to configure the logic to invoke OS page table permissions rather than hypervisor page table permissions for purposes of improving execution speed. The lifting approaches herein can assist in optimizing the security techniques herein for different situations or program types.

The techniques herein may be implemented to provide strong security for browsers.

7.0 Other Disclosure

In one embodiment, techniques use virtualization to secure a computer. Some virtualization aspects may be viewed as being more important than others. Generally speaking, the trivial partitioning of the computing resources is relatively less important. The most basic virtualization configuration that one can implement involves the injection of a hypervisor in between a server's hardware and an operating system executing on that server. The purpose of the hypervisor injection is to secure the operating system environment. This hypervisor injection is the most basic security-offering activity that one can perform using virtualization. Multiple separate operating systems may execute on the same server hardware in conjunction with the same hypervisor. Under these circumstances, the hypervisor ensures that the partition in between the operating systems is secure. Whatever happens within one operating system remains within only that operating system. If that operating system becomes corrupted, then that operating system can be restored.

Variations on these basic ideas come from two areas. The hypervisor can "see inside" the operating system and perform operations on the operating system. This capability of the hypervisor is called "introspection."

Regarding partitioning, multiple operating systems may be used as a secure system. The operating systems may execute secure applications. One or more operating systems executing on the server may be insecure operating systems. One or more secure operating system also may execute on the server. These operating systems might not be full-fledged operating systems. A user of these operating systems might not be aware that they are separate operating systems. Some existing work describes how to cause some operating systems appear to be a part of other operating systems, so that, for example, when one operating system opens up a window, that window appears within another operating system's display. Under such circumstances, the user may only be aware of the existence of one operating system, but other secure computing domains nevertheless exist in order to protect those domains from attack. Trusted computing is based on similar ideas.

More interestingly, regarding introspection, a hypervisor is given debugger-level access within an operating system so that the hypervisor can perform essentially any operation relative to the operating system. Some novelty exists in how the present techniques give the hypervisor this access.

Generally, the present techniques in this area can be divided into four categories.

A first category is the code category. A server computer has memory, an operating system, and a hypervisor which is sometimes discussed below as a VMM (virtual machine manager). In an embodiment, programmatic agents can exist in the environment in a variety of ways. The agents can be embedded within the virtual machine itself. Alternatively, the agents can communicate with the hypervisor through a secure virtual machine. The agents are always local to the machine.

In an embodiment, a database is stored locally on the machine. The database contains all of the pages in memory that can be executable on the computer. The hypervisor has independent permissions for all of the memory. The present techniques set all of the computer's memory to be non-executable. The operating system is unaware of this setting. The operating system has its own permissions. The operating system sets memory to be executable as needed. When a new program is loaded—when a piece of code is inserted into memory and executed—an execute fault is taken. This fault is taken because the code was not executable according to the hypervisor. Control transfers to agents of the security logic herein. The agents validate whether the page of memory containing the code should be executed. In response to a determination that the page should be executed, the agents make the page executable, but not writable, and return control back to the operating system. This concept is called "W XOR [exclusive or] X."

While prior approaches have provided different implementations of W XOR X, the techniques herein involve an authentication step. When the agents see a page of memory, an authentication cycle is entered. In this cycle, the page is first identified. Next, the page is authenticated. After some additional policy processing, the page is authorized. In prior approaches, operating systems do not enter into any authentication cycle. Instead, the memory is either executable or writable, and a program must indicate which of these the memory is. This prevents code from being modified.

The present techniques do not only provide such prevention. In an embodiment, processes provide the addition of the authentication cycle. The authentication cycle authenticates every piece of memory by matching those pieces against a database of all available memory pages that the agents have designated as being executable. The database indicates the complete set of all programs whose execution is permissible and indicates how such programs are loaded into memory and how each executable page of such memory should look.

When the agents encounter an executable page of memory, the agents look up that page in the database using a reverse lookup mechanism. The reverse lookup mechanism identifies the memory page as belonging to a specific program and having a specific offset within that program. If the agents find a match between the encountered executable page and a memory page in the database, then the agents consult a policy database to determine whether the execution of the executable page, or the program to which the executable page belongs, is permissible. In response to a determination that the execution of the page is permissible, the agents authorize that page. Alternatively, in response to a determination that the execution of the page is not permissible, the agents perform a remediation step. The remediation step may involve destroying the program to which the page belongs, injecting code into that program to stop that program from functioning, or other steps. This is the basic workflow of the present system in operation.

In an embodiment, determining whether modifications have occurred within code involve two general steps. One step involves determining, without knowing a priori where the code modifications have occurred, to which memory page a specified piece of code could correspond. The technique herein produces a list of candidate memory pages and then winnows that list down to the memory page that matches the piece of code.

In an embodiment, a "page oracle," when passed a page of memory, indicates to which of the memory pages in the database that passed page could correspond. Brute force checking is then performed, in which, if the passed page has a certain set of relocations, then a cryptographic hash of the passed page is taken assuming that those relocations are in place. A determination is made as to whether that hash matches a memory page in the database. A series of "what ifs" may be performed. This is probably worth discussing further.

In an embodiment, the database elements discussed above are stored locally on the client machine. The agents are either embedded within the hypervisor or located in a secure virtual machine that has privileged access to other virtual machines that are the subject of protection. That secure virtual machine only executes the agents described herein.

The systems discussed are useful in protected servers that are found in data centers and also in laptop computers.

In prior approaches, introspection is the idea of looking inside of an operating system to determine what the operating system is doing. The information gained from such introspection, without installing code on the operating system, may include identities of which processes are running and which users are logged in. In an embodiment, introspection involves more than this and involves modification of the code and thus provides for policing and modifying as opposed to learning only. In a prior approach, information simply might not be provided at all if unassumed conditions exist within the operating system. In contrast, the present techniques provide stronger guarantees; if some problem exists in the operating system, then the operating system must be stopped. The techniques herein involve enforcement rather than mere information scraping.

In an embodiment, the techniques provide for learning about what the operating system is doing, and also modifying the operating system in response, thereby changing the operating system's behavior. In an embodiment, a process herein looks at every page that executes and determines based on that examination whether to allow the operating system to continue as usual or to modify the operating system's behavior. The behavioral modification might involve injecting code or simply shutting the operating system down. The behavioral modification might involve pausing the operating system while databases of the system herein are updated. The introspection does not care about the list of processes that are executing. The system polices memory accesses. The system prevents an operating system from using memory in an undesired manner. The system prevents an operating system from creating executable memory that contains contents that do not belong to the database. The system prevents an operating system from creating executable memory that is prohibited by a policy engine.

The most common policy in the policy database likely will be a null policy. The null policy allows everything. The null policy adds tremendous value. The system is not forced to be a whitelisting system. The system herein may be contrasted with Bit9. Bit9 provides a different type of technology to provide a similar benefit. An administrator gives Bit9 a list of all programs that are allowed to run. Bit9 inserts itself into the operating system using hooks. Before allowing a user to run any program, Bit9 performs a cryptographic hash of that program and determines whether that program is included in the list of programs that the operating system is allowed to run. If the program is so included, then Bit9 allows the program to run. If the program is not so included, then Bit9 pops up a dialogue that indicates that the program is not permitted to run. Such an approach adds no value unless the database is perfectly maintained. If a malicious program is included within the list, then there will be problems when the malicious program is allowed to execute. Whitelisting is not an optimal solution because most programs, while not malicious, are vulnerable. Most people do not care about malicious programs. People are more interested in closing the vulnerabilities that non-malicious programs have. Whitelisting approaches cannot do this at all because whitelisting has nothing to do with the execution of the program; once a program is in memory and running, the whitelisting approach has already stepped out of the way. In contrast, program execution is a point at which the system herein gets in the way. This is not to say that the system herein cannot also perform whitelisting in addition to its other techniques. In many cases, such as on a developer's desktop, there is no reason to restrict the set of programs that can be executed. Thus, under such circumstances, the techniques herein might allow every program to run.

If the system detects an unknown program, then the system may stop the operating system, load the program into the database, and then let the operating system resume, thereby trusting the program when it is initially loaded. A policy may indicate that updates can only be made to programs that the client machine already has but also that related software can be added to the client machine. For example, an upgrade may involve installing a new program. That new program might be part of an upgrade package. Under those circumstances, the new program may be allowed to run. However, if a new installer is downloaded, then the system may prevent that installer from running. Other policies may expressly lock out certain programs. There may be a broad range of policies.

The manner in which the policies are set is interesting because it related to the manner in which the database is populated. Presumably, the database will be populated with every program that the agents find, unless policy expressly indicates otherwise.

A discussion of the back-end architecture follows. The client machine can attach to a much larger database that is within the enterprise and within some protection domain. Depending on the mode of operation, the client machine's database may cache the enterprise database. A hierarchy of databases, each caching another, and each located in a different protection domain, may operate in conjunction with each other. This hierarchy may include a global database that the security logic provides. There is no requirement that lower-level databases have less information that higher-level databases. There may be overlap in the contents of the client database and the global database that are not in an enterprise database; there is no requirement that any database contain a strict subset of the contents of any other database.

Assuming that caching is working correctly, the client machine's database will contain information about roughly all of the programs that are stored on the client machine. However, information about some of those programs might be missing from the client machine's database. Alternatively, information about programs that are not present on the client machine might be contained in the client machine's database. This latter situation may occur when programs formerly stored on the client machine have been erased or when information about programs not yet stored on the client machine has been fetched presumptively. Nevertheless, an attempt is made to keep the contents of the client machine's database representative of the programs that are currently stored on the client machine, in order to keep the client machine's database at a manageable size.

If the client machine's database does not contain a program's information, and if the client machine attempts to execute that program, then an error will occur or some remediation step will be performed. Remediation steps allow the automatic population of the databases. When an attempted-to-be-executed program's information is not found in the client machine's database, the remediation step that is responsively performed causes a cache fault. If the client machine is connected to a network, then the enterprise's larger database is checked to see if the enterprise database contains the program's information. If the client machine has Internet connectivity, then the client machine can consult a global database to see whether that global database contains the program's information. If the client machine cannot reach either database due to a lack of connectivity, then a different remediation step may be performed.

If the client machine determines that the enterprise database contains the program's information, then the agents may pause the program or the operating system. The manner in which the operating system or program is paused is an interesting novelty. After the operating system or program is paused, then the client machine fetches the program's information from the larger database in which that information is stored. In order to pause the program, a sleep instruction might be injected into the program. That way, the user retains control of the client machine, but the program itself is temporarily hung. A subsequent hypercall may force the program back into the control of the agents. Some risks are associated with pausing the operating system itself (the mouse pointer might freeze, for example). Thus, the operating system typically only should be paused for tiny amounts of time.

Alternatively, instead of pausing a program, the agents may either kill the program or instruct the program to gracefully terminate, and then restart the program after the program's information has been obtained from the larger database.

The hierarchy needs not be adhered to strictly; the client machine may simply ask a set of external databases whether any of those databases have the program's information. The external databases may have a peer-to-peer rather than a hierarchical relationship.

In consulting external database for program information, the client machine sends, to the external server that manages the database, a memory page (or pieces thereof, or some other representation) about which the client machine is inquiring. The external server responds either that the memory page is identifiable as belonging to a particular program or that it is not so identifiable. The external server may assume that the client machine desires to have a copy of the program to which the memory page belongs, and may transmit the code of the entire program to the client machine in response to the client machine's inquiry. Thus, the program code may be transmitted, and the client machine's database may be populated with the program's information, while the client machine's program or operating system is paused.

It is possible that the enterprise database may contain program information that the global database does not. For example, programs that are not commercially available, but are proprietary to the particular enterprise, might have program information contained in the enterprise database but not in the global database that is accessible to multiple different enterprises. Information about commercially available programs probably will be contained in the global database. If the client machine asks the enterprise database for program information that the enterprise database does not yet have, then the enterprise database may responsively seek to obtain that program information from the global database so that the enterprise database will have the program information the next time that a client machine inquires. Additionally, a client machine or database may pre-fetch program information from another external database even prior to any attempt by a client machine to execute the program to which that information pertains. Furthermore, in response to a client machine's or other database's request for program information, a particular database may indicate that the request should be sent to yet another database instead. Thus, responses to requests for program information may include referrals to other servers.

If a client machine temporarily lacks network connectivity, then the remedial step may involve a population of the client machine's local database followed by a later reconciliation with an external database after network connectivity has been re-established. For example, a client machine might temporarily be located on an airplane that does not provide any network connectivity. The user of the client machine might attempt to execute an upgraded program for the first time since that program was upgraded, but the client machine's local database might not yet contain program information for the upgrade. Under these circumstances, based on specified policy, the agents may either (a) prevent the program from executing at all, or (b) presume that the program's execution possibly should continue due to the current lack of network connectivity. The remedial step may involve introspection. The agent may inspect the program's files that are stored on the client machine's drive. The agents may attempt to verify that the program's files have been signed by the program's publisher (i.e., the company that created the program). In response to a determination that the program's files' signatures are valid, the agents may temporarily pause the operating system and populate the client machine's local database with the program's information. After the local database has been so populated, the agents may unpause the operating system and permit the program's use. After the airplane has landed, and after network connectivity has been re-established, the client machine may reconcile its database with one or more external databases such as the enterprise database and/or the global database discussed above. The reconciliation involves verifying that the program's signatures contained in the client machine's database match those for the same program contained in the external database. If the signatures do not match, then the client machine's user may be warned of the disparity and advised to shut down the client machine. If the signatures do match, then the client machine still may determine that the program state contained on the external server is superior to the program state contained on the local machine, and may update the program information based on the information from the external database.

A virtual datacenter may operate in a cloud computing environment. Data center orchestration tools create virtual machines by allowing a user to upload an image (e.g., a tarball) of the computing environment (e.g., virtual operating system and application programs) that the user desires, and then creating multiple instances of that image. Is such a virtual datacenter environment, system policy herein may involve intercepting the image, scavenging the programs that are contained within the image, and executing those programs. The policy additionally may include attempting to match the programs to upgraded versions of the programs in a database, and upgrading the programs based on information contained in the database.

Techniques for matching programs with program information in databases have some interesting nuances. At the most basic level, the agents may perform such matching by identifying a page of memory as belonging to a program (e.g., by consulting a database as described above). The agents may then fetch additional information about the program. In cases in which the agents scavenge programs that are coming into file systems, the agents may determine the installation package to which those programs belong. Refer to Red Hat Package Manager (RPM). This information may be used to help identify the programs. Regardless of the initial source of program information, such program information is likely to be supplemented with or substituted by globally produced knowledge. For example, initially, agents may scavenge a particular binary file whose identity is not definitely known; the file's file name may not be determinative of the file's identity. The agents may responsively create a signature for the unidentified binary file. If the agents determine that the signature matches information that indicates that the file is a particular build of a particular program (even if the filenames do not match), then the agents may substitute whatever information previously was stored about the program with the more complete and specific information concerning the particular build. The previously created signatures may be discarded in favor of the superior information. As a result of recognizing that the binary file actually is a particular known program, the agents may apply, to the file, any updates that become available for the program in the future. If the program had remained unidentified, then such future updates would not have been applied to the program. Furthermore, after a program has been positively identified in this manner, the agents can detect any mismatch (e.g., missing files) between the installation of the program on the local machine and the proper installation indicated by program information in the database. In response to detecting any such mismatch, the agents can repair the installation on the client machine using complete program information from the database.

The disclosure also encompasses any of the following numbered clauses:

1. A computer-implemented method comprising: implementing a memory event interface to a hypercall interface of a hypervisor or virtual machine operating system to intercept page faults associated with writing pages of memory that contain a computer program; receiving a page fault resulting from a guest domain attempting to write a memory page that is marked as not executable in a memory page permissions system; determining a first set of memory page permissions for the memory page that are maintained by the hypervisor or virtual machine operating system; determining a second set of memory page permissions for the memory page that are maintained independent of the hypervisor or virtual machine operating system; determining a particular memory page permission for the memory page based on the first set and the second set; processing the page fault based on the particular memory page permission, including performing at least one security function associated with regulating access of the guest domain to the memory page.

2. The method of clause 1 wherein the hypervisor or virtual machine operating system is any of an INTEL XEN operating system, or a VMWARE operating system.

3. The method of clause 1 wherein the hypervisor or virtual machine operating system comprises a special-purpose hypervisor integrated with a guest operating system and security logic, and wherein the security logic implements the second set of memory page permissions for one or more registers of one or more hardware elements in a computer on which the security logic is running.

4. The method of clause 3, further comprising determining a device type of one of the hardware elements and determining the particular memory page permission for the one of the hardware elements based on the device type.

5. The method of clause 3, further comprising setting one or more permissions values of page tables of an input/output memory management unit (IOMMU) of the computer to indicate that the hardware elements are not executable.

6. The method of clause 3, further comprising: associating one or more of the second set of memory page permissions with a memory of one or more of the hardware elements of the computer; blocking one or more hardware direct memory access (DMA) requests to write the memory of the one or more of the hardware elements that are marked executable.

7. The method of clause 1 wherein the memory event interface implements set, get, and event operations associated respectively with: setting bits that indicate, for the pages of memory, whether the page is readable, writable, executable; getting values of the second set of memory page permissions; and receiving the page fault in response to an attempted unexpected use of the memory page that are marked with the second set of memory page permissions.

8. The method of clause 1 wherein the particular memory page permission is a most restrictive memory page permission for the memory page that is represented in the first set and the second set.

9. The method of clause 8 wherein the first set comprises CPU hardware memory page permissions and further comprising refraining from attempting to set permissions of the first set in response to determining that the particular memory page permission is unsupported in the CPU hardware memory page permissions.

10. The method of clause 1 further comprising: determining that the particular memory page permission is readable, executable (RX); in the processing, changing the particular memory page permission to readable, writable (RW) without waking one or more other event handlers or performing special messaging or other fault processing.

11. The method of clause 1 further comprising: receiving information identifying the memory page; determining a set of one or more known memory pages in a data storage repository that may correspond to the memory page; preparing a hash value for the memory page over a first range of bytes in the memory page; comparing the hash value to other hash values in the data storage repository; receiving a first subset of references to candidate pages that match based on the first hash value; selecting a particular one of the references as a match to the memory page and processing the memory page based on metadata in the data storage repository that is associated with the particular one of the references.

12. The method of clause 11 further comprising performing a byte-by-byte comparison of the memory page to each page referenced in the first subset.

13. The method of clause 11 further comprising performing a byte-by-byte comparison of the memory page to each page in a star list that is maintained in the data storage repository.

14. The method of clause 11 further comprising computing a second hash value over a second, different range of bytes in the memory page and retrieving, from a star list of memory pages maintained in the data storage repository, a second subset of references to other candidate pages that match based on the second hash value.

15. The method of clause 14 further comprising computing third subset of references comprising an intersection of the first subset and second subset; performing a byte-by-byte comparison of the memory page to each page referenced in the third subset.

16. The method of clause 4 further comprising obtaining additional metadata relating to the memory page by any one or more of: performing introspection operations directed at the hypervisor or virtual machine operating system; querying the hypervisor or virtual machine operating system on behalf of a guest application; requesting information from one or more networked resources; validating one or more digital certificates of the computer program.

17. The method of clause 4, further comprising:
extracting, using an executable binary file representing the computer program, all possible memory pages that the computer program can generate in use; determining, for each of the all possible memory pages, fingerprint metadata to represent the all possible memory pages; storing the fingerprint metadata in a data repository.

18. The method of clause 17 wherein the fingerprint metadata comprises data for each fixed range of bytes within the memory page and an erasure mask derived from each range of variable bytes within the memory page.

19. The method of clause 17 wherein the fingerprint metadata comprises provenance data for each of the all possible memory pages.

20. The method of clause 17 further comprising accessing a binary loader that is configured to load the computer program, and using information describing the binary loader to determine an in-memory layout of the all possible memory pages.

21. The method of clause 17, further comprising distributing the fingerprint metadata to distributed data storage that is accessible to a plurality of client computers.

22. The method of clause 20, further comprising: receiving a request from a particular client computer among the plurality of client computers to obtain a set of fingerprint metadata for one or more particular memory pages; in response to determining that metadata for the one or more particular memory pages is not stored in the distributed data storage, searching for information about the computer program associated with the one or more particular memory pages using one or more networked resources.

23. The method of clause 22, further comprising replying to the request of the particular client computer by sending, to the particular client computer, a cross-request for the client computer to re-present the request at another time, or a cross-request for the client computer to provide additional information.

23. The method of clause 11, further comprising storing, in a negative cache, information indicating the computer program is an invalid or unknown program.

23. The method of clause 1, wherein the computer program is an interpretable program or script, and wherein the at least one security function comprises any of: limiting interpreter operations; authenticating script files against a data repository of fingerprint metadata; preventing unauthorized script files from being interpreted; overlaying interpreters; interpreter-specific remediation steps.

24. The method of clause 23, further comprising: monitoring a read operation that the computer program performs; comparing each seek offset into a file that the computer program issues to an expected seek offset value to determine whether the read operation is invalid; preventing completion of the read operation in response to determining that the read operation is invalid.

25. The method of clause 23, further comprising: loading an interpreter into computer memory; modifying the interpreter in the computer memory to implement the functions previously recited; permitting the interpreter to execute only after the modifying.

26. The method of clause 1, further comprising: determining that a just-in-time compiler has allocated a particular memory page in memory of a computer; in response to determining that the just-in-time compiler has allocated the particular memory page in memory of the computer: marking, using the second set of memory page permissions, a particular memory page permission associated with the particular memory page as not executable; disallowing instructions of the particular memory page to invoke any one or more of: system calls; library calls; jumps to invalid locations; jumps to prohibited locations; using other than an expected exit point or ordinary exit point.

27. The method of clause 26, further comprising: analyzing the particular memory page to determine whether instructions that compute indirect pointers are in the memory page; reviewing one or more targets of the indirect pointers; selecting a particular security function based on the one or more targets of the indirect pointers.

28. The method of clause 26 wherein determining that the just-in-time compiler has allocated the particular memory page in memory of the computer comprises any of: determining that the particular memory page has an X memory page permission; determining that a first MMAP call has originated from an executable that is known to be the just-in-time compiler; determining that a second MMAP call requested creating the particular memory page as writeable code memory; correlating the particular memory page to an executable that created it based on an association of the executable to a JIT compiler.

29. One or more non-transitory computer-readable media storing one or more sequences of instructions which when executed cause one or more computing devices to perform: implementing a memory event interface to a hypercall interface of a hypervisor or virtual machine operating system to intercept page faults associated with writing pages of memory that contain a computer program; receiving a page fault resulting from a guest domain attempting to write a memory page that is marked as not executable in a memory page permissions system; determining a first set of memory page permissions for the memory page that are maintained by the hypervisor or virtual machine operating system; determining a second set of memory page permissions for the memory page that are maintained independent of the hypervisor or virtual machine operating system; determining a particular memory page permission for the memory page based on the first set and the second set; processing the page fault based on the particular memory page permission, including performing at least one security function associated with regulating access of the guest domain to the memory page.

8.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
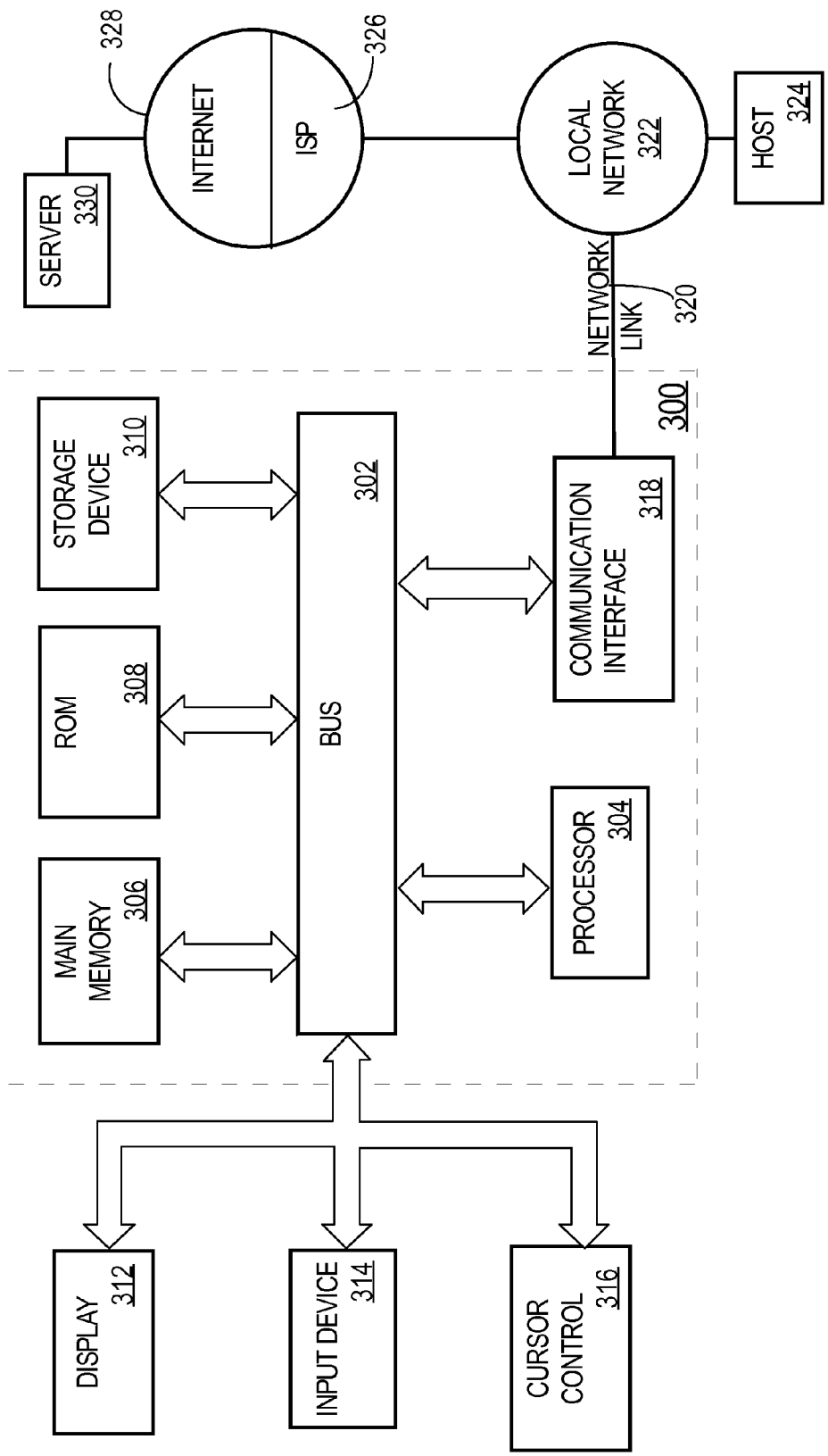
FIG. 3 is a block diagram of a computer system with which an embodiment may be used.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of clause s that issue from this application, in the specific form in which such clause s issue, including any subsequent correction.

What is claimed is:

1. A computer-implemented method comprising:
using a computer, determining a first set of memory page permissions for a memory page that are maintained in computer memory by a hypervisor or virtual machine operating system of the computer;
using the computer, determining a second set of memory page permissions for the memory page that are maintained independent of the hypervisor or virtual machine operating system;
using the computer, determining a particular memory page permission for the memory page based on the first set and the second set;
using the computer, processing a page fault based on the particular memory page permission, wherein the page fault is associated with an attempt of the computer to write to the memory page that is marked as not executable in a memory page permissions system.

2. The method of claim 1, wherein the hypervisor or virtual machine operating system is any of an INTEL XEN operating system or a VMWARE operating system.

3. The method of claim 1, wherein the hypervisor or virtual machine operating system comprises a special-purpose hypervisor integrated with a guest operating system and security logic, and wherein the security logic implements the second set of memory page permissions for one or more registers of one or more hardware elements in a computer on which the security logic is running.

4. The method of claim 3, further comprising determining a device type of one of the hardware elements and determining the particular memory page permission for the one of the hardware elements based on the device type.

5. The method of claim 3, further comprising setting one or more permissions values of page tables of an input/output memory management unit (IOMMU) of the computer to indicate that the hardware elements are not executable.

6. The method of claim 3, further comprising:
associating one or more of the second set of memory page permissions with a memory of one or more of the hardware elements of the computer;
blocking one or more hardware direct memory access (DMA) requests to write the memory of the one or more of the hardware elements that are marked executable.

7. The method of claim 1, further comprising:
receiving information identifying the memory page;
determining a set of one or more known memory pages in a data storage repository that may correspond to the memory page;
preparing a hash value for the memory page over a first range of bytes in the memory page;

comparing the hash value to other hash values in the data storage repository;
receiving a first subset of references to candidate pages that match based on the first hash value;
selecting a particular one of the references as a match to the memory page and processing the memory page based on metadata in the data storage repository that is associated with the particular one of the references.

8. The method of claim 7, further comprising performing a byte-by-byte comparison of the memory page to each page referenced in the first subset or to each page in a star list that is maintained in the data storage repository.

9. The method of claim 7, further comprising computing a second hash value over a second, different range of bytes in the memory page and retrieving, from a star list of memory pages maintained in the data storage repository, a second subset of references to other candidate pages that match based on the second hash value.

10. The method of claim 9, further comprising computing third subset of references comprising an intersection of the first subset and second subset;
performing a byte-by-byte comparison of the memory page to each page referenced in the third subset.

11. The method of claim 4, further comprising:
extracting, using an executable binary file representing the computer program, all possible memory pages that the computer program can generate in use;
determining, for each of the all possible memory pages, fingerprint metadata to represent the all possible memory pages;
storing the fingerprint metadata in a data repository;
wherein the fingerprint metadata comprises provenance data for each of the all possible memory pages or data for each fixed range of bytes within the memory page and an erasure mask derived from each range of variable bytes within the memory page.

12. The method of claim 11, further comprising accessing a binary loader that is configured to load the computer program, and using information describing the binary loader to determine an in-memory layout of the all possible memory pages.

13. The method of claim 12, further comprising:
receiving a request from a particular client computer among the plurality of client computers to obtain a set of fingerprint metadata for one or more particular memory pages;
in response to determining that metadata for the one or more particular memory pages is not stored in the distributed data storage, searching for information about the computer program associated with the one or more particular memory pages using one or more networked resources.

14. The method of claim 13, further comprising replying to the request of the particular client computer by sending, to the particular client computer, a cross-request for the client computer to re-present the request at another time, or a cross-request for the client computer to provide additional information.

15. One or more non-transitory computer-readable media storing one or more sequences of instructions which when executed cause one or more computing devices to perform:
determining a first set of memory page permissions for a memory page that are maintained by a hypervisor or virtual machine operating system;
determining a second set of memory page permissions for the memory page that are maintained independent of the hypervisor or virtual machine operating system;
determining a particular memory page permission for the memory page based on the first set and the second set;
processing a page fault based on the particular memory page permission, the page fault associated with an attempt to write to the memory page that is marked as not executable in a memory page permissions system.

16. The computer-readable media of claim 15, storing one or more further sequences of instructions which when executed cause the one or more computing devices to perform:
determining that the particular memory page permission is readable, executable (RX);
in the processing, changing the particular memory page permission to readable, writable (RW) without waking one or more other event handlers or performing special messaging or other fault processing.

17. The computer-readable media of claim 15, storing one or more further sequences of instructions which when executed cause the one or more computing devices to perform: implementing a memory event interface to a hypercall interface of the hypervisor or virtual machine operating system to intercept page faults associated with writing pages of memory that contain a computer program; and wherein processing the page fault includes performing at least one security function associated with regulating access of the guest domain to the memory page.

18. The computer-readable media of claim 15, storing one or more further sequences of instructions which when executed cause the one or more computing devices to perform:
determining that a just-in-time compiler has allocated a particular memory page in memory of a computer;
in response to determining that the just-in-time compiler has allocated the particular memory page in memory of the computer:
marking, using the second set of memory page permissions, a particular memory page permission associated with the particular memory page as not executable;
disallowing instructions of the particular memory page to invoke any one or more of: system calls; library calls; jumps to invalid locations; jumps to prohibited locations; using other than an expected exit point or ordinary exit point.

19. The computer-readable media of claim 18, storing one or more further sequences of instructions which when executed cause the one or more computing devices to perform:
analyzing the particular memory page to determine whether instructions that compute indirect pointers are in the memory page;
reviewing one or more targets of the indirect pointers;
selecting a particular security function based on the one or more targets of the indirect pointers.

20. The computer-readable media of claim 18, wherein determining that the just-in-time compiler has allocated the particular memory page in memory of the computer comprises any of:
determining that the particular memory page has an X memory page permission;
determining that a first MMAP call has originated from an executable that is known to be the just-in-time compiler;
determining that a second MMAP call requested creating the particular memory page as writeable code memory;
correlating the particular memory page to an executable that created it based on an association of the executable to a JIT compiler.

* * * * *